US010529117B2

(12) United States Patent
Hunt et al.

(10) Patent No.: US 10,529,117 B2
(45) Date of Patent: Jan. 7, 2020

(54) SYSTEMS AND METHODS FOR RENDERING OPTICAL DISTORTION EFFECTS

(71) Applicant: Facebook Technologies, LLC, Menlo Park, CA (US)

(72) Inventors: Warren Andrew Hunt, Woodinville, WA (US); Anton S. Kaplanyan, Redmond, WA (US); Michael Mara, Redmond, WA (US); Alexander Nankervis, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 59 days.

(21) Appl. No.: 15/954,506

(22) Filed: Apr. 16, 2018

(65) Prior Publication Data

US 2019/0318526 A1    Oct. 17, 2019

(51) Int. Cl.
*G06T 15/00* (2011.01)
*G06T 19/00* (2011.01)
*G02B 27/01* (2006.01)
*G02B 3/14* (2006.01)
*G06T 15/20* (2011.01)

(52) U.S. Cl.
CPC ............. *G06T 15/005* (2013.01); *G02B 3/14* (2013.01); *G02B 27/017* (2013.01); *G06T 15/20* (2013.01); *G06T 19/006* (2013.01); *G06T 2207/10148* (2013.01)

(58) Field of Classification Search
None
See application file for complete search history.

(56) References Cited

U.S. PATENT DOCUMENTS

| 8,446,433 | B1* | 5/2013 | Mallet | G06T 5/006 |
| | | | | 345/581 |
| 9,699,438 | B2* | 7/2017 | Walsh | G06T 19/006 |
| 10,317,690 | B2* | 6/2019 | Cheng | H04N 13/395 |
| 2015/0277129 | A1* | 10/2015 | Hua | G02B 27/0101 |
| | | | | 359/462 |

(Continued)

OTHER PUBLICATIONS

Matsuda, Nathan, Alexander Fix, and Douglas Lanman. "Focal surface displays." ACM Transactions on Graphics (TOG) 36.4 (2017): 86.*

(Continued)

*Primary Examiner* — Zhengxi Liu
(74) *Attorney, Agent, or Firm* — Baker Botts L.L.P.

(57) ABSTRACT

In one embodiment, a computing system may receive a focal surface map, which may be specified by an application. The system may determine an orientation in a 3D space based on sensor data generated by a virtual reality device. The system may generate first coordinates in the 3D space based on the determined orientation and generate second coordinates using the first coordinates and the focal surface map. Each of the first coordinates is associated with one of the second coordinates. For each of the first coordinates, the system may determine visibility of one or more objects defined within the 3D space by projecting a ray from the first coordinate through the associated second coordinate to test for intersection with the one or more objects. The system may generate an image of the one or more objected based on the determined visibility of the one or more objects.

20 Claims, 16 Drawing Sheets

(56) References Cited

U.S. PATENT DOCUMENTS

| | | | | |
|---|---|---|---|---|
| 2016/0148416 | A1* | 5/2016 | Wu | H04N 13/395 345/419 |
| 2017/0154464 | A1* | 6/2017 | Lanier | G06T 19/006 |
| 2017/0353682 | A1* | 12/2017 | Melikian | G02B 3/14 |
| 2018/0203235 | A1* | 7/2018 | Fix | G02B 26/06 |

OTHER PUBLICATIONS

Wu, Wanmin, et al. "Content-adaptive focus configuration for near-eye multi-focal displays." 2016 IEEE International Conference on Multimedia and Expo (ICME). IEEE, 2016.*

Barsky, Brian A., et al. "Camera models and optical systems used in computer graphics: part II, image-based techniques." International Conference on Computational Science and its Applications. Springer, Berlin, Heidelberg, 2003.*

Barsky, Brian A., et al. "Camera models and optical systems used in computer graphics: part I, object-based techniques." International conference on computational science and its applications. Springer, Berlin, Heidelberg, 2003.*

Yu, Hyeonseung, et al. "A Perception-driven Hybrid Decomposition for Multi-layer Accommodative Displays." IEEE transactions on visualization and computer graphics 25.5 (2019): 1940-1950.*

Paul Bourke, "Image Warping for Projection onto a Cylinder", published on Dec. 2004, retrieved from http://paulbourke.net/stereographics/cylinder/ on Aug. 1, 2009.*

Akeley, et al., Reality engine graphics, In Proceedings of the 20th annual conference on Computer graphics and interactive techniques, ACM, 1993, pp. 109-116.

Benthin, et al., Efficient Ray Tracing of Subdivision Surfaces Using Tessellation Caching, In Proceedings of the 7th Conference on High-Performance Graphics, 2015, 8 pages. DOI:http://dx.doi.org/10.1145/2790060.2790061.

Binder, et al., Efficient Stackless Hierarchy Traversal on GPUs with backtracking in constant time, In Proceedings of High Performance Graphics, 2016, pp. 41-50.

Carr, et al., The Ray Engine, GPU Algorithms for Radiosity and Subsurface Scattering, In Proceedings of the ACM SIGGRAPH/EUROGRAPHICS Conference on Graphics Hardware (HWWS '02), 10 pages.

Cook, et al., Distributed Ray Tracing, SIGGRAPH Comput. Graph 145, Jul. 1984, 18(3):137-145. DOI:http://dx.doi.org/10.1145/964965.808590.

Dammertz, et al., Shallow Bounding Volume Hierarchies for Fast SIMD Ray Tracing of Incoherent Rays, In Pro-ceedings of the Nineteenth Eurographics Conference on Rendering (EGSR '08), Eurographics Association, Aire-la-Ville, Switzerland, 8 pages. DOI:http://dx.doi.org/10.1111/j.1467-8659.2008.01261.x.

Davidovic, et al., 3D rasterization: A Bridge Between Rasterization and Ray Casting, In Proceedings of Graphics Interface 2012, 8 pages.

Demers, et al., Depth of Field: A Survey of Techniques, In GPU Gems, Addison-Wesley, 2004, 16 pages.

Garanzha, et al., Fast Ray Sorting and Breadth-First Packet Traversal for GPU Ray Tracing, In Computer Graphics Forum, 2010, 29:289-298.

Goldsmith, et al., Automatic Creation of Object Hierar-chies for Ray Tracing, IEEE Comput. Graph. Appl. 7, 5 (May 1987), pp. 14-20. DOI: http://dx.doi.org/10.1109/MCG.1987.276983.

Gruenschlo, et al., MSBVH: An Efficient Acceleration Data Structure for Ray Traced Motion Blur, In Eurographics, ACM SIGGRAPH Symposium on High Performance Graphics, ACM, 2011, 6 pages. DOI:http://dx.doi.org/10.1145/2018323.2018334.

Guenter, et al., Foveated 3D graphics, ACM Transactions on Graphics (TOG), Nov. 2012 31(6):1-10.

Heitz, et al., The SGGX Microfake Distribution, ACM Trans, (Jul. 2015), 11 pages. DOI:http://dx.doi.org/10.1145/2766988.

Hunt, et al., Ray-Specialized acceleration structures for ray tracing, IEEE Symposium on Interactive Ray Tracing 2008, (2008) 8 pages.

Igehy, et al., Tracing Ray Differentials, In Proceedings of the 26th Annual Conference on Computer Graphics and Interactive Techniques (SIGGRAPH '99), 1999, 8 pages. https://doi.org/10.1145/311535.311555.

Johnson, et al., The irregular Z-buffer: Hardware Acceleration for Irregular Data Structures, ACM Trans. Graph. 24, 4 (2005), 18 pages.

Karras, et al., Fast Parallel Construction of High-quality Bounding Volume Hierarchies, In Proceedings of the 5th High-Performance Graphics Conference, ACM, 2013, 11 pages. DOI:http://dx.doi.org/10.1145/2492045.2492055.

Keller, et al., The Path Tracing Revolution in the Movie Industry, In ACM SIGGRAPH 2015 Courses, 2015, Article 24, 7 pages. DOI:http://dx.doi.org/10.1145/2776880.2792699.

Kramida et al., Resolving the Vergence-Accommodation Conflict in Head-Mounted Displays, IEEE Transactions on Visualization & Computer Graphics, (2015), 20 pages. DOI:http://dx.doi.org/doi.ieeecomputersociety.org/10.1109/TVCG.2015.2473855.

Mattausch, et al., CHC+ RT: Coherent hierarchical culling for ray tracing, In Computer Graphics Forum, 2015, 34(2):1-12.

Möller et al., Fast, Minimum Storage Ray-triangle Intersection, J. Graph. Tools 2, 1 (Oct. 1997), 7 pages. DOI:http://dx.doi.org/10.1080/10867651.1997.10487468.

Molnar, et al., A Sorting Classification of Parallel Rendering, IEEE Comput. Graph. Appl. 14, 4 (Jul. 1994), 11 pages. DOI:http://dx.doi.org/10.1109/38.291528.

Parker, et al., OptiX: A General Purpose Ray Tracing Engine, ACM Trans, Graph. 29, 4, Article 66 (Jul. 2010), 13 pages. DOI: http://dx.doi.org/10.1145/1778765.1778803.

Patidar, et al., Ray casting deformable models on the GPU, Graphics & Image Processing, ICVGIP'08, Sixth Indian Conference IEEE, 2008, pp. 481-488.

Reshetov, et al., Multi-level Ray Tracing Algorithm, In ACM SIGGRAPH 2005 Papers, ACM, 2005, pp. 1176-1185. DOI:http://dx.doi.org/10.1145/1186822.1073329.

Roger, et al., Whitted Ray-tracing for Dynamic Scenes Using a Ray-space Hierarchy on the GPU, in proceedings of the 18th Eurographics Conference on Rendering Techniques, 2007, 13 pages.

Saito et al., Comprehensible Rendering of 3-D Shapes, In Proceedings of the 17th Annual Conference on Computer Graphics and Interactive Techniques, ACM, 1990, pp. 197-206. DOI:http://dx.doi.org/10.1145/97879.97901.

Toth, et al., Comparison of Pro-jection Methods for Rendering Virtual Reality, Eurographics Association, 2016, 9 pages. DOI:http://dx.doi.org/10.2312/hpg.20161202.

Wald, et al., Embree: A Kernel Framework for Efficient CPU Ray Tracing, ACM Trans. Graph. 33, 4, Article 143 (Jul. 2014), 8 pages. DOI:http://dx.doi.org/10.1145/2601097.2601199.

Wald et al., Ray Tracing Deformable Scenes Using Dynamic Bounding Volume Hierarchies, ACM Trans. Graph. 26, 1, Article 6 (Jan. 2007), 29 pages. DOI:http://dx.doi.org/10.1145/1189762.1206075.

Wald, et al., State of the Art in Ray Tracing Animated Scenes, In Eurographics 2007—State of the Art Reports, 2007, 28 pages. DOI: http://dx.doi.org/10.2312/egst.20071056.

Walter, et al., Microfacet Models for Refraction Through Rough Surfaces, In Proceedings of the 18th Eurographics Conference on Rendering Techniques (EGSR), 2007, 12 pages.

Whitted, et al., An Improved Illumination Model for Shaded Display, Commun. ACM 23, 6 (Jun. 1980), 6 pages. DOI:http://dx.doi.org/10.1145/358876.358882.

Wyman, et al., Frustum-traced Raster Shadows: Revisiting Irregular Z-buffers, In Proceedings of the 19th Symposium on Interactive 3D Graphics and Games (i3D '15), ACM, 2015, 9 pages. DOI:http://dx.doi.org/10.1145/2699276.2699280.

Patney, et al., Perceptually-Based Foveated Virtual Reality, SIGGRAPH 2016 Emerging Technologies, Jul. 24-28, 2016, Anaheim, CA, 2 pages. DOI: doi.acm.org/10.1145/9999997.9999999.

\* cited by examiner

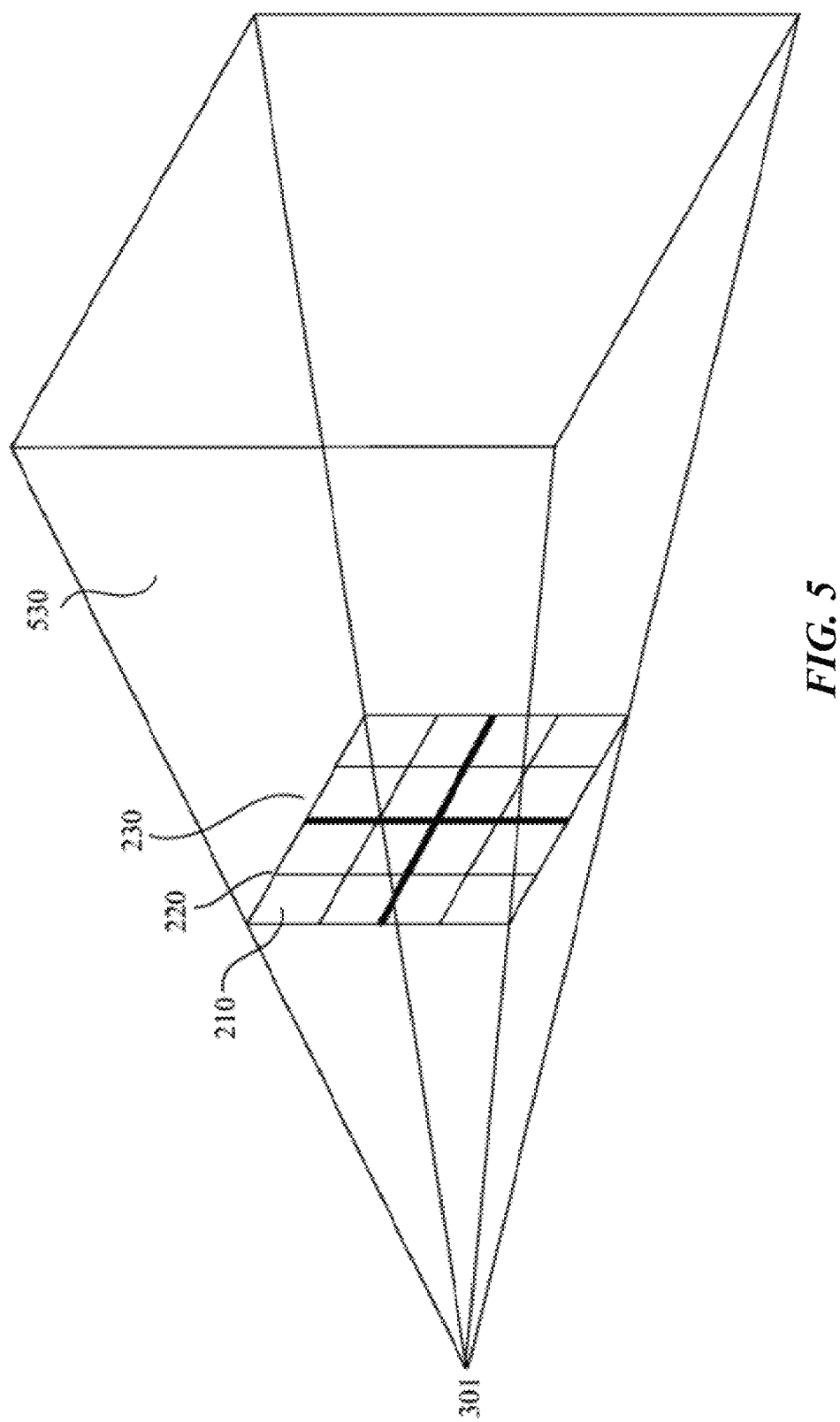

SYSTEMS AND METHODS FOR RENDERING OPTICAL DISTORTION EFFECTS

TECHNICAL FIELD

This disclosure generally relates to computer graphics, and more particularly to graphics rendering methodologies and optimizations for generating artificial reality, such as virtual reality and augmented reality.

BACKGROUND

Computer graphics, in general, are visual scenes created using computers. Three-dimensional (3D) computer graphics provide users with views of 3D objects from particular viewpoints. Each object in a 3D scene (e.g., a teapot, house, person, etc.) may be defined in a 3D modeling space using primitive geometries. For example, a cylindrical object may be modeled using a cylindrical tube and top and bottom circular lids. The cylindrical tube and the circular lids may each be represented by a network or mesh of smaller polygons (e.g., triangles). Each polygon may, in turn, be stored based on the coordinates of their respective vertices in the 3D modeling space.

Even though 3D objects in computer graphics may be modeled in three dimensions, they are conventionally presented to viewers through rectangular two-dimensional (2D) displays, such as computer or television monitors. Due to limitations of the visual perception system of humans, humans expect to perceive the world from roughly the same vantage point at any instant. In other words, humans expect that certain portions of a 3D object would be visible and other portions would be hidden from view. Thus, for each 3D scene, a computer-graphics system may only need to render portions of the scene that are visible to the user and not the rest. This allows the system to drastically reduce the amount of computation needed.

Raycasting is a technique used for determining object visibility in a 3D scene. Conventionally, virtual rays are uniformly cast from a virtual pin-hole camera through every pixel of a virtual rectangular screen into the 3D world to determine what is visible (e.g., based on what portions of 3D objects the rays hit). However, this assumes that uniform ray distribution is reasonable when computing primary visibility from a virtual pinhole camera for conventional, rectangular display technologies with a limited field of view (e.g., computer monitors and phone displays). This assumption, however, does not hold for non-pinhole virtual cameras that more accurately represent real optical sensors. Moreover, current VR viewing optics (e.g., as integrated within a head-mounted display), provide a curved, non-uniform viewing surface rather than conventional rectangular displays. As a result, conventional rendering techniques, which are designed and optimized based on the aforementioned assumptions, are computationally inefficient, produce suboptimal renderings, and lack the flexibility to render scenes in artificial reality.

SUMMARY OF PARTICULAR EMBODIMENTS

Particular embodiments described herein relate to a primary visibility algorithm that provides real-time performance and a feature set well suited for rendering artificial reality, such as virtual reality and augmented reality. Rather than uniformly casting individual rays for every pixel when solving the visibility problem, particular embodiments use a bounding volume hierarchy and a two-level frustum culling/entry point search algorithm to accelerate and optimize the traversal of coherent primary visibility rays. Particular embodiments utilize an adaptation of multi-sample anti-aliasing for raycasting that significantly lowers memory bandwidth.

Particular embodiments further provide the flexibility and rendering optimizations that enable a rendering engine to natively generate various graphics features while maintaining real-time performance. Such graphics features—such as lens distortion, sub-pixel rendering, very-wide field of view, foveation and stochastic depth of field blur—may be particularly desirable in the artificial reality context. The embodiments provide support for animation and physically-based shading and lighting to improve the realism of the rendered scenes. In contrast, conventional rasterization pipelines designed for conventional displays (e.g., rectangular monitors or television sets with uniform grids of pixels) are typically implemented in hardware and require multiple passes and/or post processing to approximate these features. Moreover, conventional ray tracers, which primarily focus on Monte Carlo path tracing, do not achieve real-time performance on current VR displays (e.g., with 1080×1200×2 resolution and 90 Hz refresh-rate requirements). The embodiments described herein, therefore, is particularly suitable for rendering artificial reality and present a concrete, viable alternative to conventional rasterization techniques.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 5 illustrates an example of a beam being cast through a block.

DESCRIPTION OF EXAMPLE EMBODIMENTS

Figure 1:
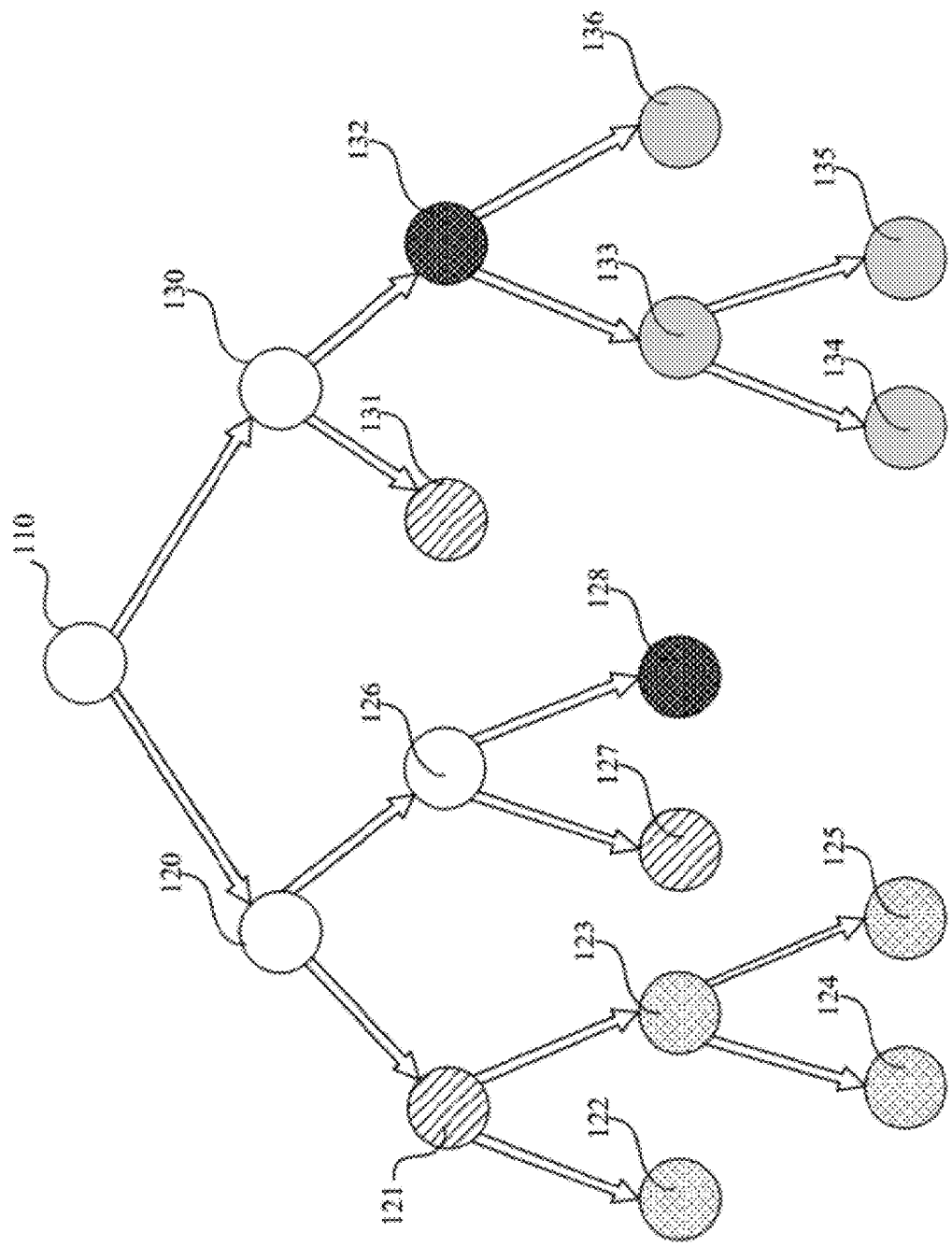
FIG. 1 illustrates an example of a bounding volume hierarchy tree data structure.

One of the fundamental problems in computer graphics is determining object visibility. At present, the two most commonly used approaches are ray tracing, which simulates light transport and is dominant in industries where accuracy is valued over speed such as movies and computer-aided designs (CAD). Due to the intense computational requirements of ray tracing, it is traditionally unsuitable for applications where real-time or near real-time rendering is needed. Another approach for determining visibility is z-buffering, which examines each 3D object in a scene and updates a buffer that tracks, for each pixel of a virtual rectangular screen, the object that is currently closest. Typically, z-buffering is implemented by current graphics hardware and lacks the flexibility to handle rendering tasks that deviate from the aforementioned assumptions (e.g., pin-hole camera and/or rectangular screens with uniform pixel distributions). Particular embodiments described herein provide a visibility algorithm that has performance characteristics close to that of z-buffering, but with additional flexibility that enables a wide variety of visual effects to be rendered for artificial reality.

To provide further context, conventional z-buffering is often used for addressing real-time primary visibility problems, largely due to its applicability to uniform primary visibility problems (e.g., for conventional rectangular screens) and the availability and proliferation of inexpensive, specialized hardware implementations. The z-buffer algorithm uses a z-buffer, a uniform grid data structure that stores the current closest hit depth for each sample/pixel. Most implementations of z-buffering assume samples/pixels are laid out in a uniform grid, matching precisely to the organization of the data structure. The uniform nature of the grid structure, combined with the uniform distribution of samples mapped onto this grid, allows for a very efficient algorithm for determining which samples overlap a polygon/triangle. The process of mapping the spatial extent of an object onto the grid is known as rasterization.

The uniform nature of the grid used in the z-buffer algorithm leads to high efficiency but makes the algorithm inflexible. The assumed uniform sample distribution is reasonable when computing primary visibility from a virtual pin-hole camera for almost all direct view display technologies such as TVs, monitors or cell phones. However, these assumptions do not hold for non-pinhole virtual cameras, secondary effects such as shadows and notably for modern virtual reality devices due to the distortion imposed by the viewing optics of a head mounted display, and currently must be worked around on a case-by-case basis.

Algorithms such as the irregular z-buffer still use a uniform grid but allow for flexible number and placement of samples within each grid cell. Irregular z-buffering suffers from load-balancing issues related the conflict between non-uniform sample distributions in a uniform data structure, making it significantly more expensive than traditional z-buffering. Further, having a uniform data structure means that the algorithm supports only a limited field of view and does not support depth of field rendering.

In contrast to z-buffering, ray tracing algorithms take a more general approach to determining visibility by supporting arbitrary point-to-point or ray queries. The ability to effectively model physically-based light transport and naturally compose effects led it to be the dominant rendering algorithm rendering movie scenes. However, the flexibility that ray tracing provides comes at significant cost in performance, which has prevented it from becoming prevalent in consumer real-time applications, such as VR/AR.

Particular embodiments described herein overcome the shortcomings of existing rendering techniques to achieve ray rates in excess of 10 billion rays per second for nontrivial scenes on a modern computer, naturally supporting computer-graphics effects desirable for artificial reality.

Particular embodiments address the visibility problem in computer graphics. In particular embodiments, a rendering system may use a raycaster that uses a three-level (or more) entry-point search algorithm to determine visibility. At a high level, the system may take a hierarchical approach where larger beams (e.g., a coherent bundle of rays) are first cast to determine collision at a broader scale. Based on the hits/misses of the beams, more granular beams or rays may be cast until the visibility problem is solved. It should be noted that even though certain examples provided herein describe beams as representing coherent bundles of primary rays, this disclosure contemplates using beams to represent any type of rays (e.g., primary rays, specular reflection rays, shadow rays, etc.) whose coherent structure may be exploited by the embodiments described herein to achieve computational efficiency. In particular embodiments, the system may be implemented in a heterogeneous manner, with beam traversal occurring on the central processing unit (CPU) and ray-triangle intersection and shading occurring on the graphics processing unit (GPU). In other embodiments, every computation task may be performed by the same type of processing unit.

In order to improve performance, particular embodiments may use an acceleration structure to organize scene geometry. These structures may be based on space partitioning (grids, k-d or k-dimensional tree, binary space partitioning or BSP tree, octree) or object partitioning (bounding volume hierarchy or BVH). By organizing the geometry into spatial regions or bounding them in enclosing volumes, the structures allow a system to avoid testing rays with objects if the rays do not enter the volume bounding the object.

In particular embodiments, an axis-aligned bounding volume hierarchy is a hierarchical tree data structure that stores scene geometry (usually triangles) at the leaves of the tree and an axis-aligned bounding box at each node. The bounding box associated with each node may conservatively enclose all of the geometries associated with the node's sub-tree. In particular embodiments, rays (or other visibility queries such as beams) may be traversed recursively through the tree from the root and tested against nodes' children's bounding volumes. Recursive traversal of a node's children may only occur in the case of intersection, so rays/beams can avoid traversing portions of the tree whose parent nodes are miss by the rays/beams.

FIG. 1 illustrates an example of a BVH tree data structure 100. Each node (e.g., 110, 120-128, 130-136) in the tree 100 may be associated with a bounding volume in the 3D modeling space in which objects are defined. The tree 100 may have a root node 110 that is associated with a large bounding volume that encompasses the bounding volumes associated with the child nodes 120-128, 130-136. Node 120 may be associated with a bounding volume that contains the bounding volumes of its child nodes 121-128 but not the bounding volumes of nodes 130-136. Node 121 may be associated with a bounding volume that contains the bounding volumes of its child nodes 122-125 but not the bounding volumes of any of the other nodes. Node 122 may be associated with a bounding volume that contains geometries (e.g., triangles) but not any other bounding volume.

In particular embodiments, the system may use a four-way axis-aligned BVH as the geometry acceleration structure. In particular embodiments, a single, combined BVH may be used for all scene geometry. In other embodiments, the system may take a multilevel approach to allow for instancing and to enable more efficient animation by allowing for more granular BVH rebuilds and refits. Rudimentary animation is supported via global BVH refit per frame.

In particular embodiments, the BVH may be laid out in memory in depth-first preorder and store triangles in a contiguous array, in the order they would be touched in a depth-first traversal of the BVH. Additionally, any node with a mix of leaf and internal children may store the leaf children first. With these assumptions, iterating in reverse through the list of BVH nodes may guarantee that a node's children will always be visited before it will and that all triangles will be visited in a linear, reverse, order. These assumptions enable a linear, non-recursive BVH refit algorithm and improves cache locality during refit, traversal and intersection.

Particular embodiments for computing primary visibility may perform visibility tests using the BVH. As previously described, whether an object (or portion thereof) is visible from a particular viewpoint may be determined by testing whether the object (or the portion thereof) intersects with a ray. Shooting multiple rays from each pixel for every pixel can be computationally expensive and resource intensive, however, especially when the area that needs to be covered is large. For example, if 32 sample rays are used per pixel, 32 intersection tests would need to be performed for each pixel and a ray buffer of sufficient size needs to be allocated to store the results. Shooting so many rays may be especially wasteful in scenes with few objects, since most of the rays would not intersect anything.

Instead of shooting rays, particular embodiments may perform intersection tests using beams. In particular embodiments, the system may perform hierarchical intersection tests using, in order, (1) larger frusta beams that project from a relatively larger "block" (a beam footprint to be described in more detail below), (2) smaller frusta beams that project from "tiles" (also a beam footprint to be described in further detail below), and (3) procedurally generated subsample rays (interchangeably referred to as "subrays" herein). In particular embodiments, unless an intersection is found using the larger frusta beam, intersection tests need not be performed for the sub-beams or rays, thereby avoiding unnecessary computations. In particular embodiments, pixel shading may be based on a single subsample ray's intersection results rather than the results of all 32 subsample rays. To further optimize performance, particular embodiments may procedurally generate (e.g., which may be pseudo-randomly) the subsample rays on the fly when performing intersection tests, rather than retrieving predefined subsample ray locations from memory. Procedural ray generation has the benefit of not needing to read from memory, thereby saving time and bandwidth.

Figure 2:
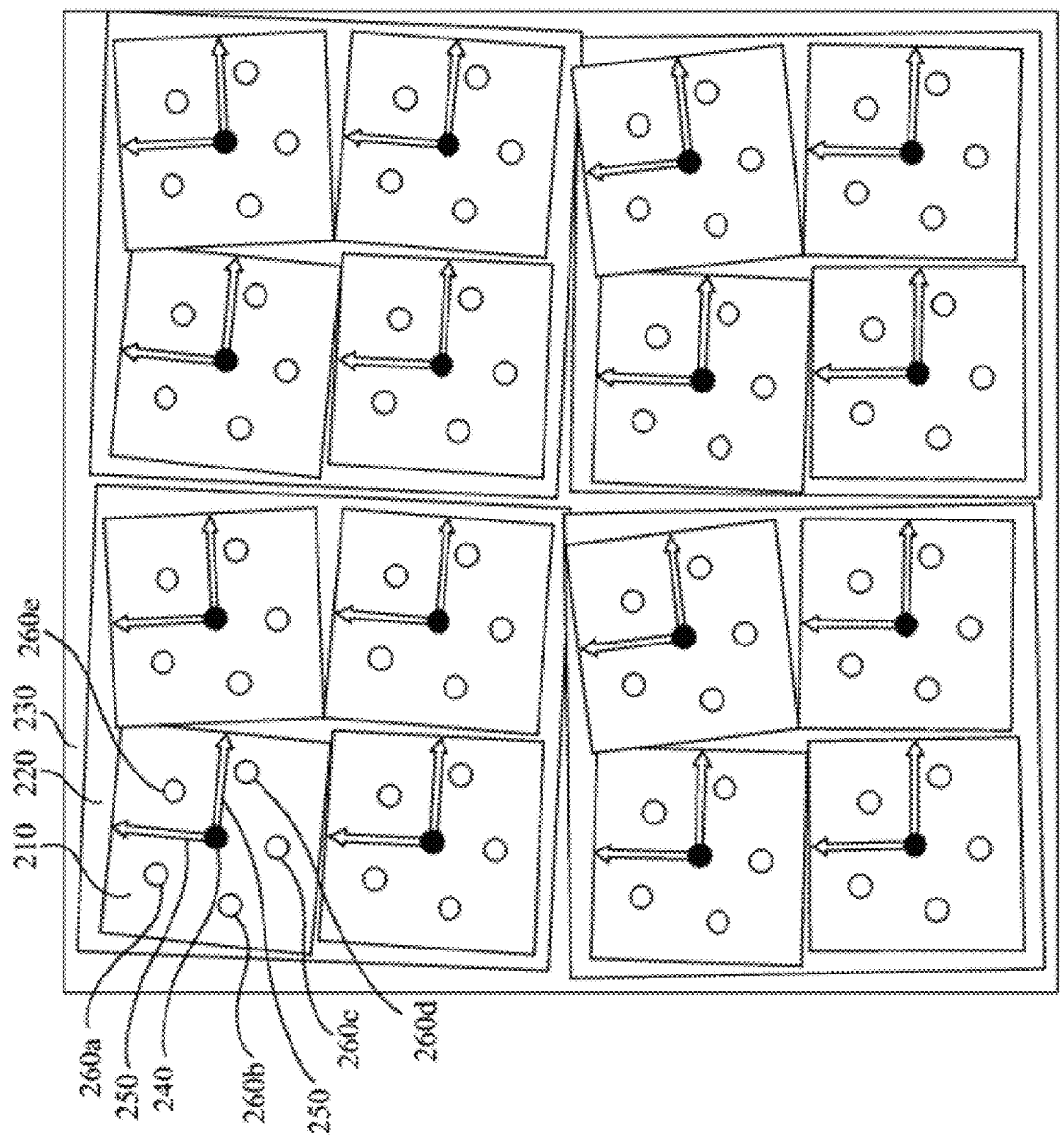
FIG. 2 illustrates an example three-level hierarchy for defining locations from which rays/beams are projected.

FIG. 2 illustrates an example three-level hierarchy for defining locations from which rays/beams are projected. In particular embodiments, a ray footprint 210, which may be considered as the first-level of the hierarchy, may correspond to a pixel footprint and be defined by a footprint center 240 and differentials 250 (e.g., each differential 250 may specify the distance of a footprint's boundary from the center 240 of the footprint 210). In particular embodiments, subsample locations 260*a-e* are assigned to a footprint 210 for anti-aliasing. In the example shown in FIG. 2, each footprint 210 includes five subsample locations 260*a-e*. Although the particular example shows five subsample locations 260*a-e* per footprint 210, any other number of subsample locations may be implemented and/or defined by an application (e.g., 32 subsample locations per footprint 210).

Figure 3:
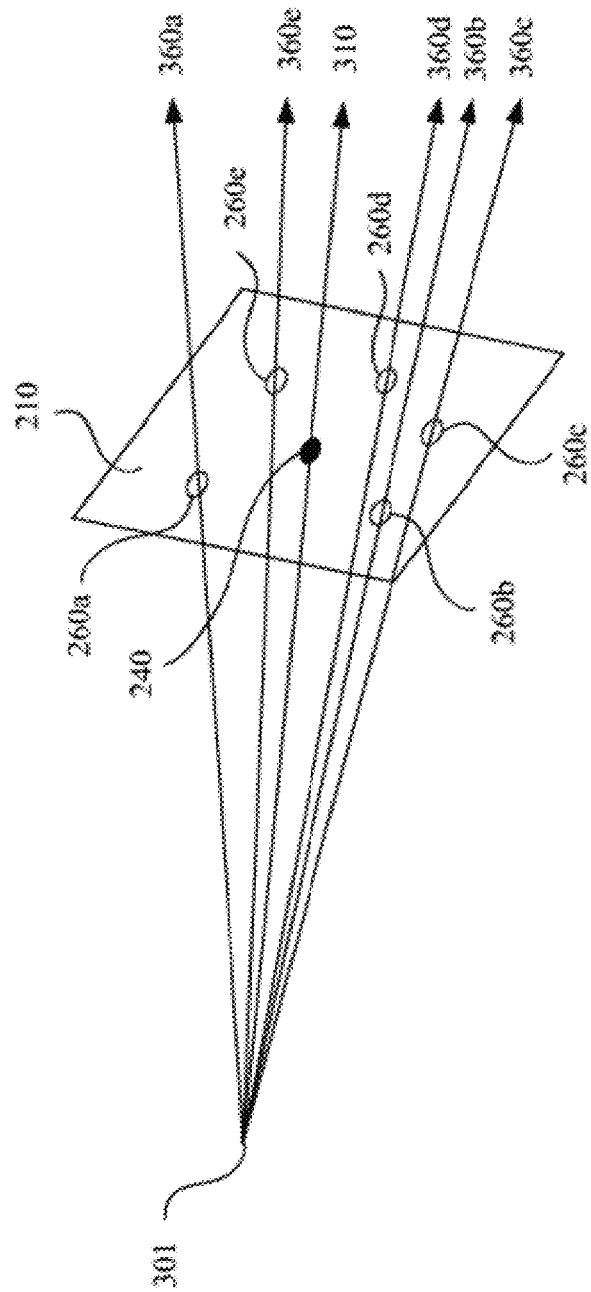
FIG. 3 illustrates an example of rays and subsample rays associated with a footprint

FIG. 3 illustrates an example of rays and subsample rays (or subrays) associated with a footprint. In particular embodiments, a ray 310 may be associated with a footprint 210, with the ray 310 projecting through the center 240 of the footprint 210. As shown in FIG. 2, the footprint 210 may be defined by two vectors 250 (also referred to as differentials) that are mutually perpendicular with each other and the ray direction. The extent of the footprint 210 may be defined by the length of these vectors 250. In particular embodiments, subsample rays (or subrays) may be procedurally generated within this footprint 210 by first transforming a low-discrepancy point set on, e.g., the unit square of the footprint 210, using the coordinate frame defined by the ray 310 direction and footprint vectors 250. Examples of transformed points are represented by the subsample locations 260*a-e*, illustrated as hollow points. Ray directions may then be added to the transformed points (e.g., subsample locations 260*a-e*), and the subsample rays 360*a-e* may be defined to be rays projecting through the original ray's 310 origin 301 and the newly transformed points 260*a-e*, respectively. The subsample rays, for example, may be used for multi-sample anti-aliasing. In particular embodiments, for depth-of-field rays, the ray origin may also be chosen using a separate low-discrepancy point set (without translating along the ray direction).

In particular embodiments, shading may be performed one per pixel per triangle, as in regular multi-sample anti-aliasing (MSAA), which saves a large amount of shading computations. In particular embodiments, shading may be performed for every sample to get full super-sample anti-aliasing (SSAA). Since the subrays are procedurally generated rather than predefined (and stored in memory), the ray memory bandwidth may be reduced by the anti-aliasing factor when compared to naively rendering at higher resolution.

In particular embodiments, primary rays (e.g., 310) are assigned footprints (e.g., 210) for anti-aliasing and then aggregated into a second-level hierarchy and a third-level hierarchy with four-sided bounding beams with different granularity. Each beam location in the finer, second-level hierarchy may be referred to as a tile (e.g., an example of a tile is labeled as 220 in FIG. 2). Each tile 220 may include a predetermined number of pixels footprints 210. Although the example shown in FIG. 2 illustrates each tile 220 having 2×2 pixel footprints 210, any other arrangements of pixel footprints 210 may also be implemented (e.g., each tile 220 may include 16×8 or 128 pixel footprints 210). The tiles 220 may then be aggregated into a coarser collection of blocks 230, which is the term used herein to refer to the third-level hierarchy. Each block 230 may contain a predetermined number of tiles 220. Although the example shown in FIG. 2 illustrates each block 230 containing 2×2 tiles 220, any other arrangements of tiles 220 may also be implemented (e.g., each block 230 may include 8×8 or 64 tiles). Thus, in an embodiment where each block 230 contains 8×8 tiles 220 and each tile 220 contains 16×8 pixel footprints 210, each block 230 may represent 8,192 pixel footprints 210. The number of rays represented by a beam stemming from a block 230 can be computed by multiplying the number of pixel footprints 210 in the block 230 by the multi-sampling rate (e.g., 5 subsample rays per pixel footprint 210). Thus, if each block 230 represents 8,192 pixel footprints 210, the block 230 would represent 40,960 subsample rays. In particular embodiments, the choice of defining the ratio between pixels and tiles to be 128:1 and the ratio between tiles and blocks to be 64:1 is based on coarse tuning for particular hardware, but other ratios may be more optimal for other types of hardware.

Figure 4:
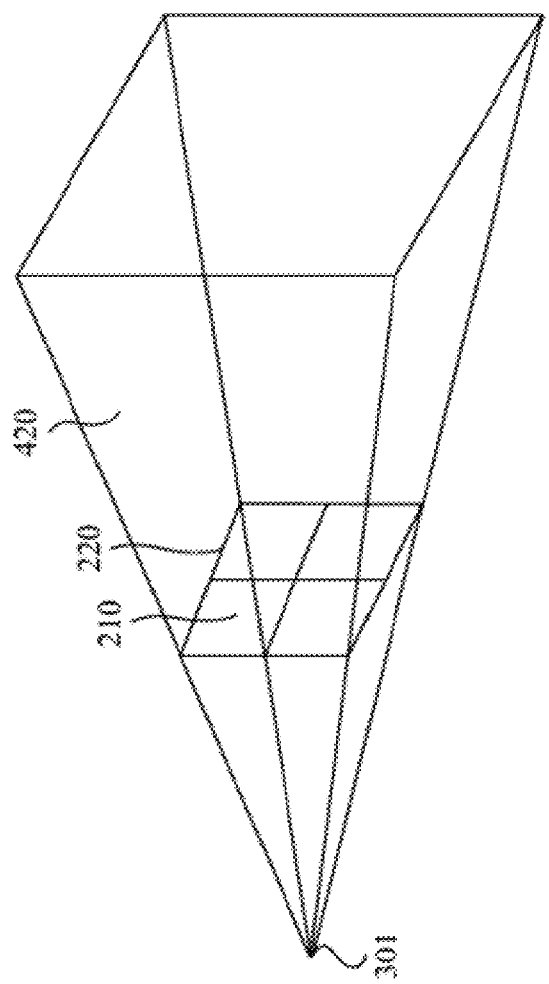
FIG. 4 illustrates an example of a beam being cast through a tile.

In particular embodiments, instead of casting rays for all visibility tests, beams may be cast from the blocks and tiles in a hierarchical manner to optimize visibility computation. FIG. 4 illustrates an example of a beam 420 being cast from a point origin 301 (e.g., the camera or viewpoint) into a 3D modeling space through a tile 220 (in the illustrated example, the tile 220 contains 2×2 pixel footprints 210). The solid beam 420 in this example resembles a frustum stemming from the tile 220. The volume of the beam 420 may be defined by the vectors projecting through the four corners of the tile 220. An object or triangle intersects with the beam 420 if the object/triangle intersects with any portion of the volume of the beam 420. Similarly, FIG. 5 illustrates an example of a beam 530 being cast from a point origin 301 into a 3D modeling space through a block 230 (in the illustrated example, the block 230 contains 2×2 tiles that each contains 2×2 pixel footprints 210). The solid beam 530 in this example resembles a frustum stemming from the block 230. The volume of the beam 530 may be defined by the vectors projecting through the four corners of the block 230. An object or triangle intersects with the beam 530 if the object/triangle intersects with any portion of the volume of the beam 530.

Particular embodiments for scene updates and triangle precomputation will now be described. In particular embodiments, before rendering begins, animation may be performed (e.g., the 3D object models in the scene may change) and the BVH is refit. In particular embodiments, bone animation may occur on the CPU, while linear blend skinning and BVH refit may be implemented in a series of CUDA kernels in the following example stages: (1) transform vertices (perform linear blend skinning); (2) clear BVH node bounds; (3) precompute triangles (e.g., by (a) gathering vertices (b) compute edge equations (for a Moller-Trumbore ray-triangle intersection), and (c) computing triangle bounds and atomically update corresponding leaf bounding box); and (4) refit BVH by propagating bounds from leaf nodes up through internal node hierarchy. In particular embodiments, after refit is performed on the GPU, the BVH may be copied back to CPU memory for the block and tile traversal stages. At this point, block and tile bounds may be computed and refit, if needed.

Figure 6A:
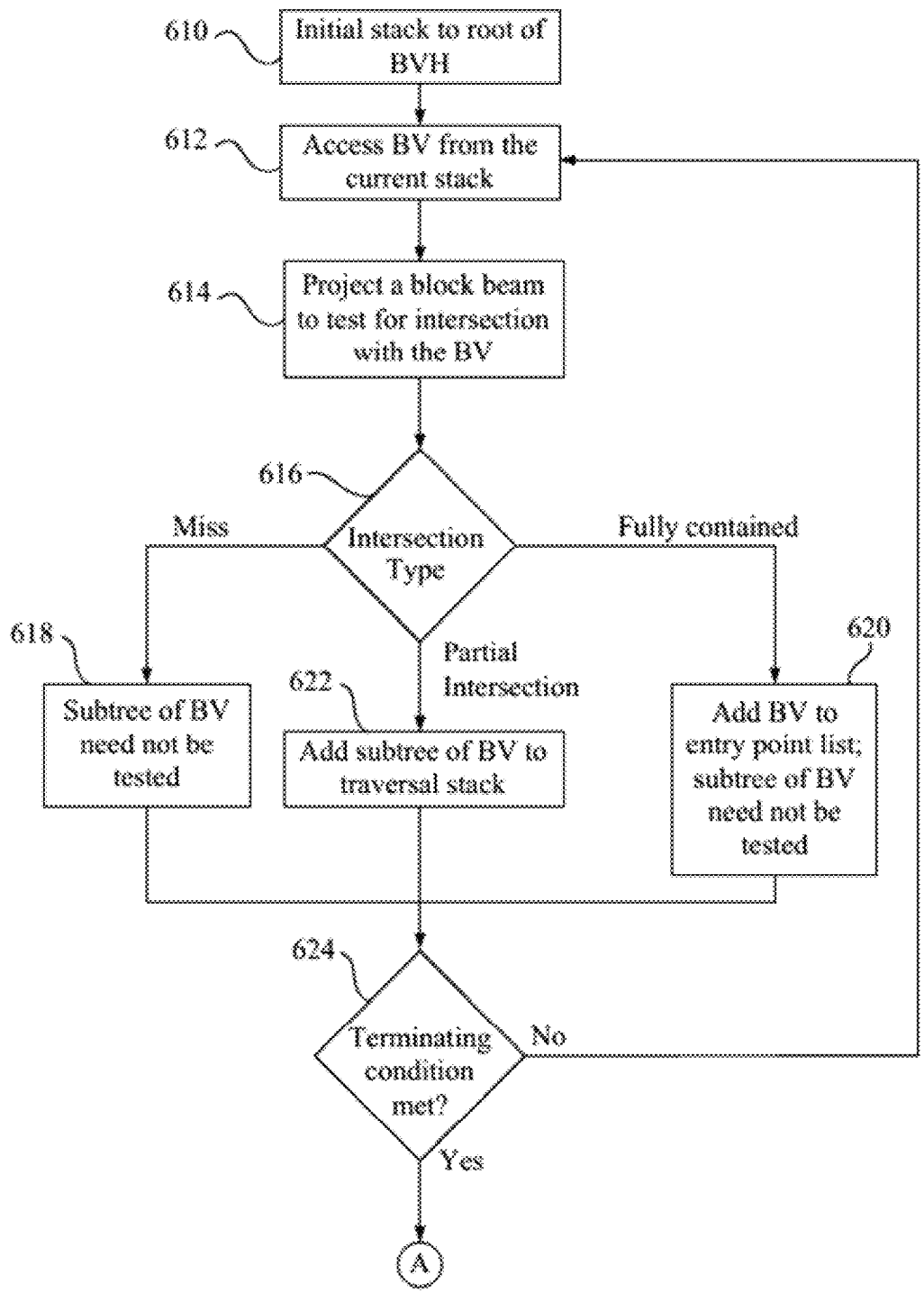
FIGS. 6A-C illustrate an example of a method for determining visibility.
Figure 6B:
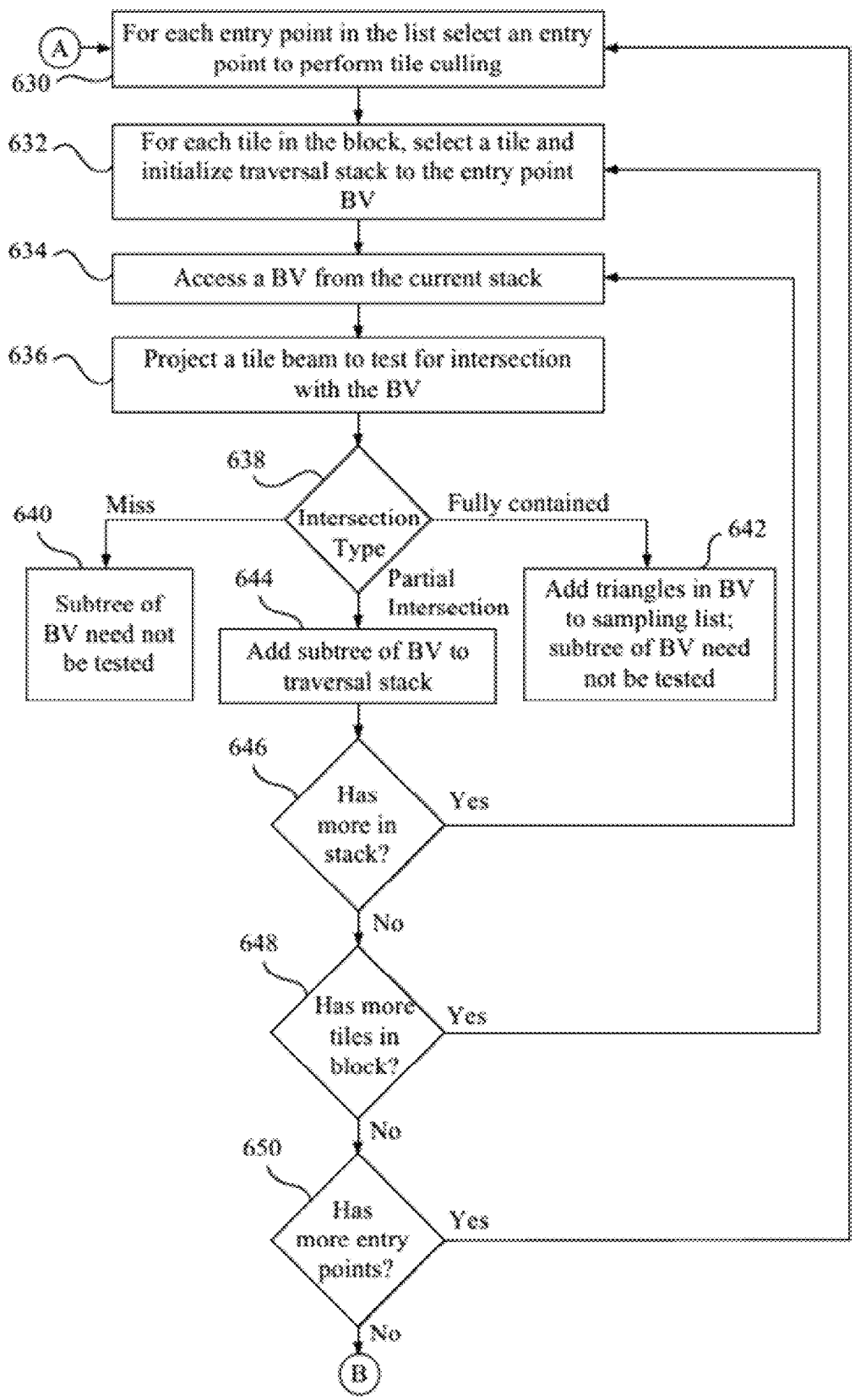
Figure 6C:
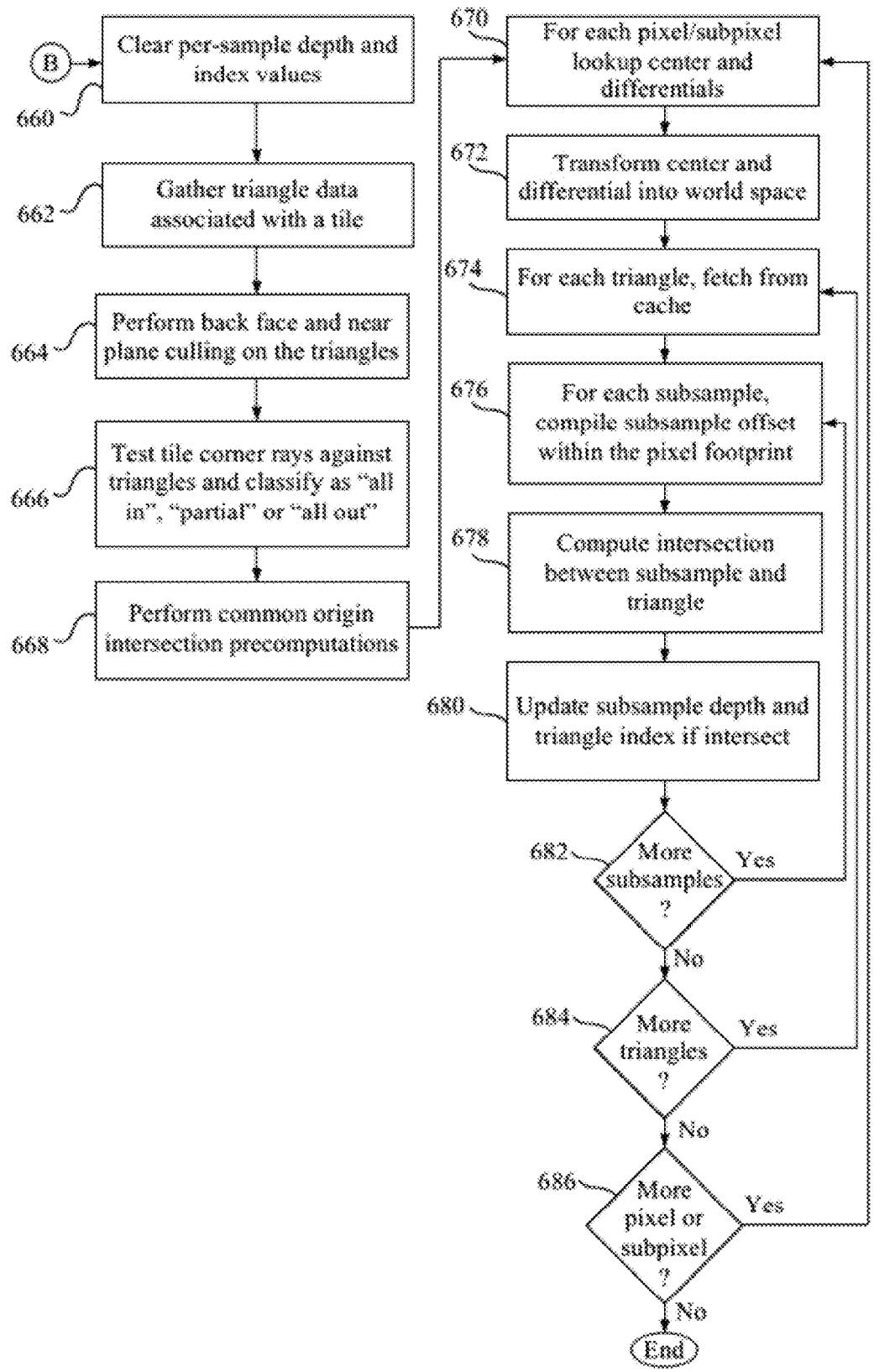

FIGS. 6A-C illustrate an example of a method 600 for determining visibility according to particular embodiments. The illustrated embodiment performs a three-level entry point search algorithm, but additional levels may also be implemented in other embodiments (e.g., using a fourth beam footprint that includes a collection of blocks, a fifth bean unit that includes a collection of fourth beam units, and so on). In particular embodiments, the three-levels are conceptually divided into a block culling phase, a tile culling phase, and a ray sample testing phase.

FIG. 6A illustrates an example of a block culling phase. During this phase, a computing system may traverse through the BVH hierarchy and use beams stemming from blocks (e.g., as shown in FIG. 5) to test for intersections with selected bounding boxes associated with nodes in the BVH. In particular embodiments, each such beam is defined by 128×64 pixel footprints. In particular embodiments, the implementation of beam traversal uses an explicit stack AVX implementation. Because block traversal is a culling/entry point search phase, rather than traversing all the way to the leaves, as a traditional ray tracer would do, block traversal only traverses until it reaches a specific stopping criterion (e.g., when 64 entry points have been discovered).

In particular embodiments, a screen for which a scene is to be generated (e.g., a virtual screen in the 3D space that corresponds to the display screen used by the user) may be divided into n number of blocks. For each block, the system may perform a three-level test to determine what is visible from that block. In particular embodiments, the visibility test may be performed by projecting a beam from the block. For ease of reference, a beam projected from a block is referred to as block beam herein.

In particular embodiments, the method may begin at step 610, where an explicit traversal stack (e.g., a data structure used to track which nodes of the BVH is to be tested for intersection) may be initialized with the BVH's root (e.g., node 110 shown in FIG. 1), which is associated with a bounding volume (BV), which may be a bounding box, for example. The bounding volume may be defined within the 3D space. In certain scenarios, the bounding volume may contain smaller bounding volumes. For example, referring to FIG. 1, every child node (e.g., 120-128 and 130-136) corresponds to a bounding volume within the bounding volume of the root 110. Objects (e.g., primitive geometries such as triangles, larger objects defined by a collection of primitive geometries, etc.) defined in the 3D space may be contained within any number of bounding volume. For example, an object contained by the bounding volume associated with node 125 is also contained within the bounding volumes associated with nodes 123, 121, 120, and 110.

At step 612, the system may access a bounding volume, based on the traversal stack, to test for intersection with the block beam. As an example, initially the system may perform intersection tests with the bounding volume associated with the root node 110, and in later iterations perform intersection tests against child nodes of the root node 110, depending on what is in the traversal stack. In particular embodiments, at each step during traversal, the thickest box along the primary traversal axis in the traversal stack may be tested. This allows the system to more efficiently refine the nodes down to individual surface patches. Despite the overhead of sorting, it has been observed that this improved tile/block culling performance by 5-10%.

At step 614, the system may simulate the projection of a beam, defined by a block, into the 3D space to test for intersection with the selected bounding volume. As shown in FIG. 5, the volume 530 of the block beam may be tested against the bounding volume to determine the extent, if any, of intersection.

At step 616, the system may determine that the outcome of the intersection test is one of the following: (1) a miss—meaning that the beam misses the bounding volume entirely; (2) fully contained—meaning that the beam contains the bounding volume fully/entirely; or (3) partial intersection—meaning that the beam and the bounding volume intersect but the bounding volume is not fully contained within the beam. If the system determines, at step 618, that the test outcome is a miss, the system may remove/discard the subtree of the current node from being candidates to be tested for intersection with the block beam. For example, referring again to FIG. 1, node 132 may represent a miss, meaning that the bounding volume associated with the node 132 does not intersect the block beam at all. As such, the smaller bounding volumes contained within that bounding volume (e.g., bounding volumes associated with nodes 133-136 in the subtree of node 132) need not be tested further, thereby providing substantial computational savings. If instead the system determines, at step 620, that the test outcome is fully contained, the system may accumulate the bounding volume as an entry point and no further traversal of the associated node's subtree is required as it is transitively fully contained. Referring to FIG. 1, node 121 may represent a bounding volume that is fully contained within the block beam. As such, the smaller bounding volumes contained within that bounding volume (i.e., bounding volumes associated with nodes 122-125 in the subtree of node 121) need not be tested against the block beam (but may be tested in the subsequent tile-culling phase), thereby providing substantial computational savings. If instead the system determines, at step 622, that the test outcome is partially contained (e.g., the bounding volume partially intersects with the block beam), the system may add/insert the subtree associated with the bounding volume into the traversal stack for continued refinement. Referring to FIG. 1, node 110 may represent a bounding volume that partially intersects the block beam. As such, the smaller bounding volumes contained within that bounding volume may be further tested against the block beam. For example, in response to a determination that the bounding volume of node 110 partially intersects with the block beam, the system may insert the top node of each subtrees (e.g., node 120 and 130) into the traversal stack for further intersection tests against the block beam.

In particular embodiments, at step 624, the system may determine whether one or more terminating conditions for the block-culling phase are met. If no terminating condition is met, the system may continue to perform intersection tests against bounding volumes associated with the nodes stored in the traversal stack. For example, after determining that the bounding volume of the root node 110 partially intersects the block beam, the system may, in the next iteration, test whether the smaller sub-bounding volume associated with, e.g., node 120 or 130 intersects with the block beam. This process may continue until a terminating condition is met. For example, traversal may continue until the traversal stack is empty. If so, the system may sort the accumulated entry points (or fully contained bounding volumes) in near depth order and pass them onto the tile-culling phase for further processing. Another terminating condition may be when the sum of the size of the traversal stack and the size of the list of fully contained bounding volumes equals a prespecified value, such as 32, 64, 128, etc. In particular embodiments, the traversal stack and the list may be merged, sorted in near depth order and passed onto the tile-culling phase. Thus, no more than a fixed number of entry points are ever passed from the block-culling phase onto tile-culling phase.

In particular embodiments, during traversal, the separating axis theorem is used to determine separation between bounding volumes and the block beam. When sorting the entry points before hand-off to tile cull, the near plane along the dominant axis of the beam may be used as the key value.

The tile-culling phase picks up where the block culling phase left off. In particular embodiments, each entry point identified during the block-culling phase is further tested using 64 tile-culling phases (e.g., corresponding to the 8×8 or 64 tiles in the block, according to particular embodiments). In particular embodiments, tile culling may be implemented in an explicit stack AVX traversal, as in block cull. However, rather than beginning by initializing the traversal stack with the root node in the BVH, the traversal stack may be initialized by copying the output of the associated block cull. In this way, tile cull avoids duplicating a significant amount of traversal, performed during block cull. In particular embodiments, the beam/box tests have similar potential outcomes as in block cull, but traversal may continue until the traversal stack is empty. Once all triangles have been gathered, they are copied through CUDA to the GPU for sample testing. In particular embodiments, in high depth complexity scenes, excessive numbers of triangles may be eagerly gathered and potentially tested, despite the fact that they may be occluded by nearer geometry. Short-circuiting tile traversal may require interleaving tile cull and sample testing, which implies migrating tile cull to a CUDA implementation.

FIG. 6B illustrates an example of a tile-culling phase to process the outcome from a block-culling phase. As previously described, the block-culling phase may generate a list of entry points by projecting a block beam and testing for intersections with bounding volumes. The resulting entry points may be used as the starting points during the subsequent tile-culling phase. The tile-culling phase, in general may test for intersection using tile beams contained within the block beam. As previously described, each second beam is defined by a tile footprint that is smaller than the block footprint.

The tile-culling phase for processing the result of a block-culling phase may begin at step 630, where the system may iteratively select an entry point in the list generated during the block-culling phase and perform tile culling. The entry point, which is associated with a node or bounding volume in the BVH, is known to intersect with the block beam. In the tile-culling phase, the system attempts to determine, at a finer granularity, which tiles of the block intersects with the bounding volume or its sub-volumes. Thus, given a selected entry point, the system, may iteratively project tile beams contained within the block beam to test for intersections.

For a given entry point, the system, at step 632, may iteratively select a tile in the block to perform intersection test. In particular embodiments, prior to testing the entry point against a particular tile beam, the system may initialize a traversal stack to be the bounding volume associated with the entry point. Doing so provides efficiency gains, since the tile-culling phase need not start from the root of the BVH (the work has already been done during the block-culling phase). Referring to FIG. 1 as an example, the system may initialize the traversal stack with node 121, which was determined to be a suitable entry point during the block-culling phase.

At step 634, the system may access a bounding volume, based on the traversal stack, to test for intersection with the block beam. As an example, initially the system may perform intersection tests with the bounding volume associated with the node 121, which was deemed a suitable entry point during the block-culling phase, and in later iterations perform intersection tests against its child nodes, depending on what is in the traversal stack. In particular embodiments, at each step during traversal, the thickest box along the primary traversal axis in the traversal stack may be tested.

At step 636, the system may simulate the projection of a beam, defined by a tile, into the 3D space to test for intersection with the bounding volume. As shown in FIG. 4, the volume 420 of the tile beam may be tested against the bounding volume to determine the extent, if any, of intersection.

At step 638, the system may determine that the outcome of the intersection test is one of the following: (1) a miss—meaning that the beam misses the bounding volume entirely; (2) fully contained—meaning that the beam contains the bounding volume fully/entirely; or (3) partial intersection—meaning that the beam and the bounding volume intersect but the bounding volume is not fully contained within the beam. If the system determines, at step 640, that the test outcome is a miss, the system may remove/discard the subtree of the current node from being candidates to be tested for intersection with the tile beam. If instead the system determines, at step 642, that the test outcome is fully contained, the system may accumulate the triangles/polygons in the bounding volume to be tested in the subsequent phase. No further traversal of the associated node's subtree is required as it is transitively fully contained. In other words, any additional bounding volume contained within the current bounding volume may be removed from being a candidate to be tested for intersection with the tile beam. If instead the system determines, at step 644, that the test outcome is partially contained (e.g., the bounding volume partially intersects with the tile beam), the system may add/insert the subtree associated with the bounding volume into the traversal stack for continued refinement (e.g., when the process repeats at step 634).

As an example, the system may start with an entry point such as node 121 in FIG. 1. In certain scenarios, the system may determine that the bounding volume associated with node 121 partially intersects the projected tile beam. Based on this determination, the system may insert the subtrees of node 121 (e.g., 122 and 123) into the traversal stack. Then when repeating step 634, the system may test node 122, for example, for intersection by projecting the tile beam against the bounding volume associated with the node 122. In certain scenarios, the system may determine that the projected tile beam fully contains the bounding volume associated with node 122 and adds the triangles/polygons in the volume to a list for sampling.

In particular embodiments, the traversal may continue until the traversal stack is empty. Thus, at step 646, the system may determine whether any nodes remain in the traversal stack. If a node exists in the stack, the system may return to step 634 to test that node against the tile beam. If no more node exists in the stack, then at step 648 the system may determine whether there are additional tiles in the block that have not yet been tested against the original entry point. If so, the system may return to step 632 to test the entry point against an un-tested tile for intersections. Otherwise, the system at step 650 may determine whether additional entry points from the block-culling phase still need to be tested. If so, the system may return to step 630. Otherwise, the system in particular embodiments may pass the gathered triangles/polygons onto the ray sample testing phase.

In particular embodiments, a ray sample testing phase may be performed after the tile-culling phase. In particular embodiments, the ray sample testing phase may be broken into per-tile and per-pixel phases. In particular embodiments, both phases may be completed using a single CUDA kernel with a workgroup size of 128. In the per tile portion, threads may be mapped 1:1 with triangles and in the per-pixel phase threads may be mapped 1:1 with pixels. In particular embodiments, the threads may alternatively be mapped 1:1 with subpixels, in which case the phase may be referred to as the per-subpixel phase. As used in this context, a subpixel is an individual LED, such as red, green or blue, and is distinct from a subsample in the multi-sample anti-aliasing sense. Thus, a subpixel may have many subsamples. The system may support both multi-sample anti-aliasing (MSAA) and super-sample anti-aliasing (SSAA), the distinction being that in MSAA shading is performed only once per pixel per triangle and the results are shared across all subsamples of that pixel that strike the same triangle, and that in SSAA shading is computed separately per subsample. The advantage of MSAA is a potentially large reduction in shading rate. Triangle data for the tile may be gathered into a shared local cache on the GPU for ease of access from all samples. This triangle cache may have 128 entries. In particular embodiments, the per-tile and per-pixel/subpixel phases may alternate until all triangles for a tile have been processed.

FIG. 6C illustrates an example of a sample testing phase to process the triangle intersections identified after a tile-culling phase. After a tiling-culling phase, the system may have identified a list of triangles that intersect with the associated tile beam. During the sample testing phase, the system attempts to further sample the triangles at the finer pixel level and may utilize subsample rays to do so (e.g., for anti-aliasing). In particular embodiments, the aforementioned per-tile phase may be represented by steps 660 to 668 and the per-pixel/subpixel phase may be represented by the steps starting from step 670.

At step 660, before testing the triangles that intersect with a tile beam, the system may perform initializations by, e.g., clearing the per-subsample depth and index values. During the per-tile phase, the system may, at step 662, gather triangle data into a shared memory cache. At step 664, the system may perform back-face and near plane culling on the triangles. At step 666, the system may test tile corner rays against triangles and classify the intersections as fully contained, partial intersection, and miss, similar to the classifications described above. At step 668, the system may perform common origin intersection precomputations (when applicable).

In particular embodiments, once the per-tile phase has completed, each thread may associate itself with a pixel/subpixel, and performs the following steps during the per-pixel/subpixel phase. The system may test for intersection using rays contained within the tile beam with which the triangles intersect. In particular embodiments, the rays (including subsample rays) may be procedurally generated.

In particular embodiments, at step 670, the system may, for each pixel/subpixel in the tile, look up a footprint center and differentials associated with the ray's footprint. At step 672, the system may transform the center (e.g., FIG. 2, labels 240) and differentials (e.g., FIG. 2, labels 250) into the 3D world space. The center and differentials may define the ray footprint through which rays may be generated and projected into the 3D space to test for intersections with the objects (e.g., triangles).

In particular embodiments, the system may iteratively project rays associated with the ray footprint against each triangle. For example, at step 674, after the ray footprint has been determined, the system may fetch a triangle from cache. The triangle may be tested against each ray sample in the ray footprint iteratively. For example, at step 676, the system may, for each ray sample, compute subsample offset within the pixel footprint via a lookup table (e.g., FIG. 2 at label 260*a*). At step 678, the system may compute ray-triangle intersection for the ray defined by this subsample (e.g., FIG. 3 at label 360*a*). At step 680, upon determining that the ray intersects with the triangle, the system may store information associated with the intersection. For example, the system may update subsample depth and triangle index in the case of successful intersection. After a single ray of the pixel/subpixel has been tested against the triangle, the system may determine at step 682 whether additional samples should be made (e.g., based on FIG. 2, each pixel has five subsamples). If so, the system may repeat step 676 to generate another ray and test for intersection. If the triangle has been tested against all the subsamples, the system, at step 684, may determine whether there are more triangles that intersect with the tile beam, as determined during the tile-culling phase. If so, the system may repeat step 674 to sample another triangle using rays associated with the current ray footprint. If no more triangle exists, the system may then determine whether there are more pixels/subpixels within the tile that should be tested against the triangles. If so, the system may repeat step 670 to perform intersection tests using rays from another pixel/subpixel against the triangles that intersect with the tile.

Once all of the triangles have been processed, visibility for the tile is fully resolved and the per-subsample depth and triangle index buffers contain the closest hit for each subsample. In particular embodiments, at this point subsample data may be compressed and emitted to a "gbuffer" in preparation for shading. The "gbuffer" in this case may consist of only visibility information: pairs of triangle indices and subsample masks, which is sufficient to recompute barycentrics and fetch vertex attributes in the shading phase. The "gbuffer" may be allocated to be large enough to hold a fixed number (e.g. 32) of entries in order to handle the case where each subsample of each subpixel strikes a different triangle and is stored in global memory on the GPU. Memory is addressed such that the first triangle for each pixel are adjacent in memory, followed by the second triangles, etc., so in practice only a small prefix of this buffer is actually used. In particular embodiments, compression may perform the following steps: (1) sort the subsamples by triangle index; and (2) iterate over the subsamples and emit, e.g., triangle index and multi-sample mask for each unique triangle index. Once the "gbuffer" has been constructed the sample testing phase is complete and the resolve/shading phase begins.

After visibility has been computed during the sample testing phase, the system may perform shading, aggregates MSAA or SSAA samples and computes final pixel/subpixel color to a buffer that can be presented as a rendered computer-generated scene that includes visible objects defined within the 3D space. In particular embodiments, each sample location is read from the output of the previous stage and ray intersections are computed for each "gbuffer" entry at the pixel center. Then, shading may be performed using attributes interpolated using barycentrics obtained during intersection, and the shading result may be accumulated per pixel. Once all "gbuffer" entries are processed per pixel, the system may perform filmic tonemapping and output the results to the final buffer for display. In the case of SSAA, rays may be generated, intersected, and shaded independently rather than having a single weighted shading result per entry.

In particular embodiments, the resolve/shading phase may include the following steps. For example, the system may look up sample location (e.g., from a linear buffer of samples generated in a previous stage). The system may then compute differentials (e.g., analytically when in closed form, otherwise in finite differencing). Then the system may transform ray and differentials to 3D world space in preparation for intersection. The system may clear the shading result accumulator to 0. Then for each "gbuffer" entry, the system may fetch triangle data, perform ray-triangle intersection for the pixel center and compute depth and barycentric coordinates, clamp baycentric coordinates to triangle bounds, interpolate vertex attributes based on barycentric coordinates, perform shading/lighting, and accumulate shading result. The system may then scale the accumulated shading results by, e.g., 1/subsampling rate. The system may then perform tonemapping and output the results.

Particular embodiments may repeat one or more steps of the method of FIGS. 6A-C, where appropriate. Although this disclosure describes and illustrates particular steps of the method of FIGS. 6A-C as occurring in a particular order, this disclosure contemplates any suitable steps of the method of FIGS. 6A-C occurring in any suitable order. Moreover, although this disclosure describes and illustrates an example method for performing primary visibility computations, including the particular steps of the method of FIGS. 6A-C, this disclosure contemplates any suitable method for performing primary visibility computations, including any suitable steps, which may include all, some, or none of the steps of the method of FIGS. 6A-C, where appropriate. Furthermore, although this disclosure describes and illustrates particular components, devices, or systems carrying out particular steps of the method of FIGS. 6A-C, this disclosure contemplates any suitable combination of any suitable components, devices, or systems carrying out any suitable steps of the method of FIGS. 6A-C.

One advantage of the present embodiments is that it may be implemented within a conventional graphics pipeline. At a high level, an application in need of rendering may issue instructions to a graphics driver, which in turn, may communicate with an associated GPU. Through the graphics application programming interface (API) of the driver, the application may specify how a scene should be rendered. For example, the application may submit geometry definitions that represent objects in a 3D space for which a scene is to be generated. In particular embodiments, the application may also submit a ray buffer that defines how location and trajectory of rays. To avoid needing a significant amount of memory to store the ray buffer and the runtime cost of reading/writing the buffer, particular embodiments may further allow a user to specify a procedure definition that may be used to procedurally generate rays at runtime. Based on the information provided, the rendering system may perform visibility computations, such as using raycasting, as previously described. Once the visibility of the geometries has been determined, the system may proceed with shading and outputting the final scene.

The flexibility provided by the embodiments described herein enable a rendering system to naturally implement a variety of rendering features relevant to virtual reality or augmented reality, in contrast to existing systems that simulate such effect using post-processing. Moreover, existing graphics APIs focus on a specific case of a uniform grid of primary sampling points. While current hardware rasterizers are highly tuned for this use case, rendering for AR/VR displays requires additional high-performance functionality that is more naturally achieved by raycasting in accordance with particular embodiments. Particularly, the existing graphics APIs are incapable of handling the following cases: (1) direct subpixel rendering through known optical distortion on different subpixel arrangements; (2) varying multi-sample and/or shading rate across the screen (e.g., for foveated rendering/scene-aware work rebalance); (3) depth-of-field sampling patterns for depth-of-field approximation for varifocal displays; and (4) beam racing.

Particular embodiments described herein support the aforementioned use cases based on the following features, which may be implemented as enhancements to the visibility-determination portion of the graphics pipeline. For example, to support optical distortion rendering on different subpixel arrangements, the system may allow an application using the rendering engine to specify and render with non-uniform grid sampling patterns and use independent color channel sampling. To support varying multi-sample/shading, the system may allow an application to specify a measure of "importance" per pixel/tile/block. To support depth-of-field, the system may allow an application to specify and render with non-uniform grid sampling patterns and non-point-origin sampling patterns. Each of these features, along with beam racing, will be described in further detail.

At a high-level, when any kind of lens distortion is desired, the distortion may be applied to the rays (e.g., determining ray directions) before bounding beams are computed via principal component analysis. When subpixel rendering is enabled, red, green and blue channels may be considered using separate grids and tiled and blocked separately. When depth of field is present, the beams may be expanded to accommodate the distribution of ray origins. When using a foveated ray distribution, ray bundles may be generated using a top-down divisive algorithm to build tiles containing no more than n pixels (e.g., 128) and blocks containing no more than m (e.g., 64) tiles. The system may support partially occupied tiles and blocks. For most use cases, these bounds may be computed once, at the beginning of time, based upon the lens parameters of the system. However, in the case that parameters change between frames, such as the point of attention during foveated rendering, they may be recalculated on a per-frame basis. The bounding beams may bound the entire footprint of every pixel, rather than just their centers, to support MSAA.

Particular embodiments enable a graphics system to support direct optical-distortion rendering and subpixel rendering. One of the primary differences between head mounted and traditional displays is the use of viewing optics. In addition to allowing a user to focus on the display, the viewing optics add a variety of aberrations to the display as viewed. Notably, head mounted displays usually produce a pin-cushion distortion with chromatic dependency, which causes both color separation and non-uniform pixel spacing. This leads to the user effectively seeing three different displays, one for each color (e.g., red, green, and blue), with three different distortion functions. Traditionally, these artifacts may be corrected during a post-processing image distortion phase. For example, conventional rendering systems, which do not support direct-distortion rendering, would produce a conventional rectangular image. To properly view the image via a head-mounted display, a post-processing stage takes the rectangular image and create a warped image for head-mounted viewing optics. Not only is the conventional multi-stage process inefficient, the resulting effect is suboptimal.

Particular embodiments described herein enable a renderer to accept/receive lensing parameter information (e.g., lens aperture, curvature, etc.) and use such information to produce images that are intrinsically warped, without the need for post-processing. Advantages of direct subpixel rendering include an increase in clarity. By taking into account the spatial placement of the subpixels, a more accurate intensity can be defined for each subpixel, rather than for the whole pixel simultaneously. Additionally, direct subpixel rendering obviates the need for large pre-distortion render targets. For example, the certain conventional VR devices have an eye-buffer resolution of 3024×1680, or 1.96 times that of the output display resolution of 2160×1200 pixels. Given the image presented to the display is cropped by a barrel distortion mask, only about 85% of the 2160×1200 pixels are actually presented. Because of these large guard bands or over-rendering of the eye buffer, fewer than 50% of the total pixels need to be rendered. Thus, by rendering directly using the embodiments described herein, significant computation could be saved. Direct subpixel rendering improves image quality further by avoiding the distortion correction resampling pass, which introduces both aliasing and blur, most noticeably for near-Nyquist detail such as text. Finally, by removing the full-frame distortion correction pass, direct distortion rendering enables the opportunity to render just in time.

To support optical distortion rendering on different subpixel arrangements, the system may allow an application using the rendering engine to specify and render with non-uniform grid sampling patterns and use independent color channel sampling. Optical distortion, in general, is due to the physics of lenses that causes light to be bent in distorted ways. In conventional rendering systems, the assumption is that the camera is a pinhole camera with uniform optics. To generate the image that would be captured by such a pinhole camera, conventional systems project rays from the pinhole camera into the 3D space through points on a flat, uniform virtual image plane. As such, a uniform grid sampling pattern traditionally suffices. However, since real-world optics are not perfect and complex (e.g., with multiple lens stacks), light does not in fact enter and exit the optics in a straight line, and the degree at which the light bends depends on its points of entry/exit and the curvature and density of the optics. Thus, images generated using a uniform grid pattern do not accurately represent what one would expect to perceive.

Particular embodiments of a rendering system allow an application (e.g., a VR or gaming applications that send requests to the rendering system) to specify a focal surface map. The focal surface map may be defined as a curved surface in space with any desired curvature. Conceptually, a focal surface map defines, for each pixel, the corresponding point in space that would be in focus as seen through the pixel. In particular embodiments, the focal surface map may map screen coordinates to particular locations in the 3D world or camera space. The focal surface map may act like a control surface that specifies how screen pixels should be extended into the 3D world space. In particular embodiments, a focal surface map may have the same 2D size as the output image, so that there is a 1-to-1 mapping between a value stored in the focal surface map and a pixel in the output image. Thus, when determining visibility for a particular pixel, the system may look up the corresponding value in the focal surface map to find the point in 3D space through which a ray should pass. In particular embodiments, the surface map may be stored as float3 or half3 buffers that map screen space to the 3D world space (or camera space). In particular embodiments, if the focal surface map is smaller than the pixels, the focal surface map may be defined as a Catmull-Rom surface and the precise coordinate in 3D space that a pixel maps to may be determined using interpolation. In particular embodiments, to handle field of views greater than 180 degrees, the system may switch vertex/geo/tessellation shader to output world-space positions. In particular embodiments, if a focal surface map is defined, the vertex positions throughout the shader pipeline may be defined in world/camera space.

Figure 7:
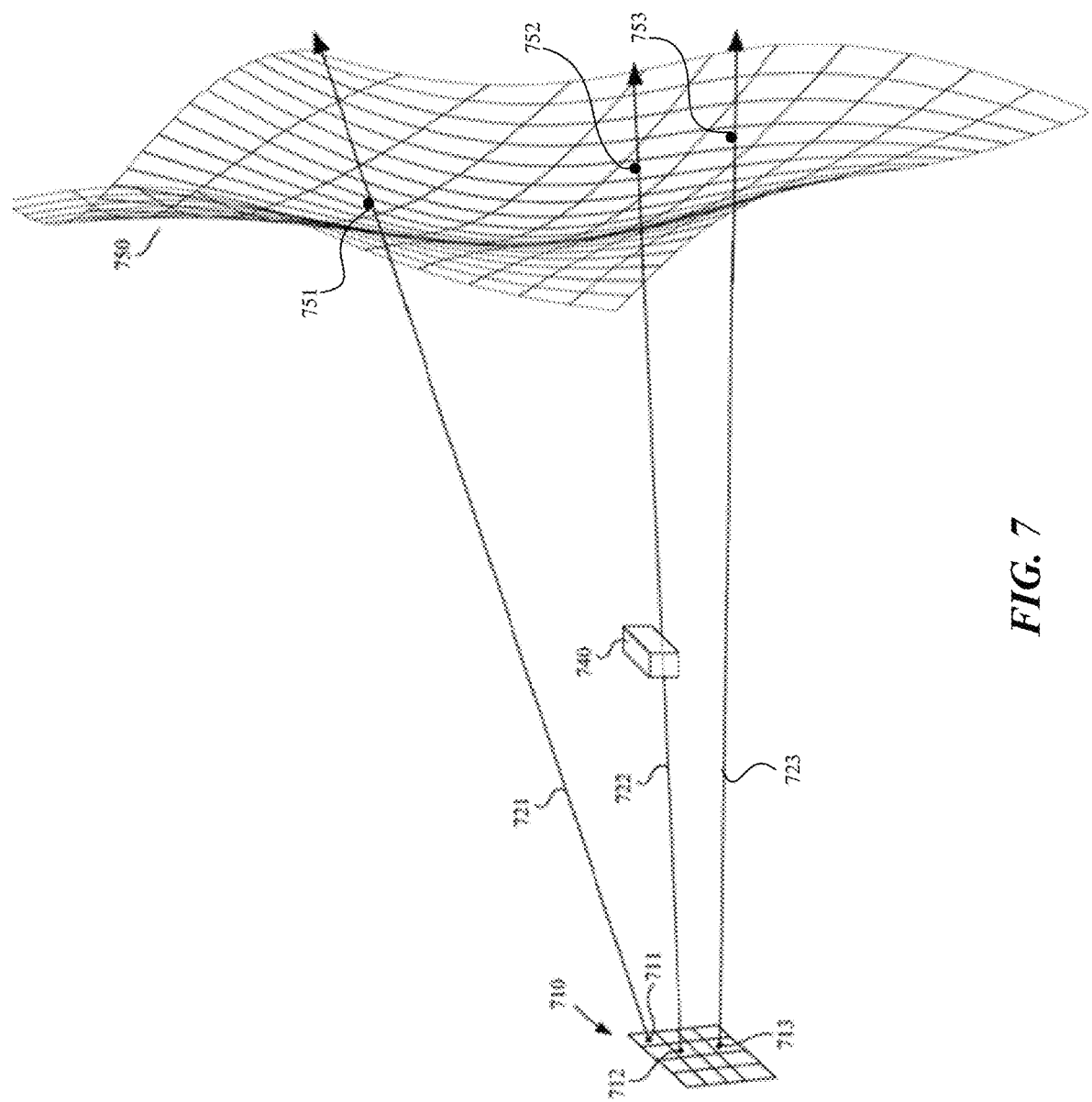
FIG. 7 illustrates an example of a focal surface map.

FIG. 7 illustrates an example of a focal surface map 750 if it were to be displayed in a 3D world space. The focal surface map 750, in particular embodiments, may be mathematically or algorithmically defined. In other embodiments, the focal surface map may be defined as a lookup-table. In either case, given a coordinate in screen space, the focal surface map 750 may be used to determine a corresponding coordinate in the 3D space. For example, FIG. 7 includes a conceptual representation of a virtual image sensor array 710 (which may also represent a corresponding screen). Each illustrated grid in the sensor 710, such as grids 711-713, may represent a sensor for a corresponding pixel. The focal surface map 750 may define particular points 751, 752, and 753 in 3D space that respectively corresponds to representatively points 711, 712, and 713 of their respective pixels (or subpixels). As previously described, each point, such as point 751, conceptually may represent the point in space that would be in focus as seen at the corresponding point 711. During raycasting/tracing, rays 721, 722, and 723 may be projected from the points 711, 712, and 713, respectively, through points 751, 752, and 753, respectively, as specified by the focal surface map 750. The rays 721, 722, and 723 may be used to determine object visibility. For example, object 740 in FIG. 7 is visible from point 712, but not points 711 and 713. In particular embodiments, subsample rays associated with each pixel may similarly be mapped onto the focal surface map 750. For example, in addition to point 711, additional subsample locations may be associated with the same pixel footprint. A projection of the subsample locations may be defined on the focal surface map 750. For example, the projection of the subsample locations may be defined to be within the same grid in which point 751 is defined. During a visibility test, object intersections may be tested by casting subsample rays from the subsample locations through the corresponding projection of the subsample location on the focal surface map 750.

The focal surface map 750 provides applications/users with the flexibility to define any desired ray directions to generate any desired resulting effects. For example, if an application wishes to simulate optical distortion, it may define a focal surface map 750 that approximates the desired distortion caused by optics. Based on the focal surface map 750, individual rays may be projected in any direction (rather than being cast uniformly through a conventional grid), similar to how light would be bent by the optics.

The focal surface map may also be used to support wide field of view (FoV) rendering. A noticeable difference between head mounted and traditional displays is that head mounted displays could support much wider field of view. While a typical desktop display consumes about 30° of the viewer's FoV, current VR headsets start around 90° and can go as high as 210°. Because of the uniform sample grid assumption made in the conventional z-buffer algorithm, the number of samples required to render an image goes up with the tangent of the half angle of the FoV (assuming a fixed minimum angular resolution). This leads to a precipitous loss in efficiency towards 180° FoV. For example, the difference between 140° and 160° is almost 4 times the number of rendered pixels. In order to mitigate this inefficiency, the approach of rendering multiple narrow FoV images and stitching them together has been studied. Although this improves the efficiency of the z-buffer algorithm, it comes at the cost of repeatedly processing geometry for each additional view, as well as increased and potentially noticeable seam stitching artifacts. To address these shortcomings, embodiments described herein adapt a raycaster to support arbitrary ray distributions to support wide FoV rendering. As another example, if an application wishes to render scene with a wide field of view (e.g., greater than 90°, 120°, 180°, 210°, etc.), it may define a focal surface map that causes rays to bend progressively outwards as the ray origins deviate from the screen center (e.g., the smallest angle between two rays, such as rays projecting from opposite sides of the scene, may be greater than 90°, 120°, 180°, 210°, etc.). For instance, the focal surface map may define a concave hyperbolic surface with respect to the camera. The camera may be positioned within the surface of curvature, such as at the center of curvature (e.g., to get 180° FoV), behind the center (e.g., to get 120° FoV), or in front of the center (e.g., to get 210° FoV). Since the focal surface map provides applications with the flexibility to specify how rays should travel, wide FoV may be natively generated without resorting to patching operations that suffer from the limitations and costs described above.

The focal surface map may additionally be used to support defocus blur and depth of field blur, which are desired effects in VR/AR since they provide a level of realism that humans expect. Defocus blur is a natural effect in all non-pinhole cameras and a commonly simulated effect in synthetically generated images. In virtual reality, depth of field is also an important effect in variable focus displays where content off of the plane of focus needs to be rendered with a synthetic blur to match the expectations of the human visual system. Conventional rendering systems, however, typically assume the camera to be a pinhole camera, resulting in sharp focus throughout (in other words, with infinite depth of field). To simulate blur, conventional systems perform post-processing on sharply rendered images. Not only is the conventional process for simulating defocus or depth-of-field blur inefficient, the blurring effect is also inaccurate. This is because the simulated blur is typically performed by averaging neighboring pixel colors, whereas actual defocus or depth-of-field blur is due to light behavior and lens physics.

Particular embodiments enable a rending system to support certain camera parameters that may be used to stochastically generate defocus or depth-of-field blur. For example, particular embodiments may generate real-time stochastic blur using aperture and focal depth parameters (e.g., via a focal surface map) that represent a visual system. A unique feature of the embodiments described herein is that the same machinery is used for both defocus blur and MSAA, which allows the system to shade at a rate close to the display resolution, despite the significant number of additional rays. Shading differentials can be calculated based on the width of the depth of field packet, which in addition to providing correct pre-filtering, improves performance by requiring coarser MIP levels during texture reads. In addition to efficiently supporting defocus blur, embodiments described herein can do so accurately and composibly. In contrast, image space defocus blur algorithms (e.g., post-processing an output image by blurring neighboring pixels) do not integrate as naturally with a variety of effects such as foveation (due to the requirement of synthesizing dense, rectilinear color and depth maps from the foveated image before computing image space depth of field) or wide field of view (due to the non-uniform, anisotropic differences in angular resolution between pixels across the image plane, the need to simultaneously stitch multiple views, or both).

To support defocus blur and/or depth-of-field blur, particular embodiments allow an application to specify and render with non-uniform grid sampling patterns and non-point-origin sampling patterns. As described elsewhere herein, particular embodiments may allow users to define a focal surface map. In addition, particular embodiments may allow an application to specify a thin lens model for modifying parameters of the ray origins. In particular embodiments, the radius of the lens or the aperture of the virtual camera may be specified.

Figure 8:
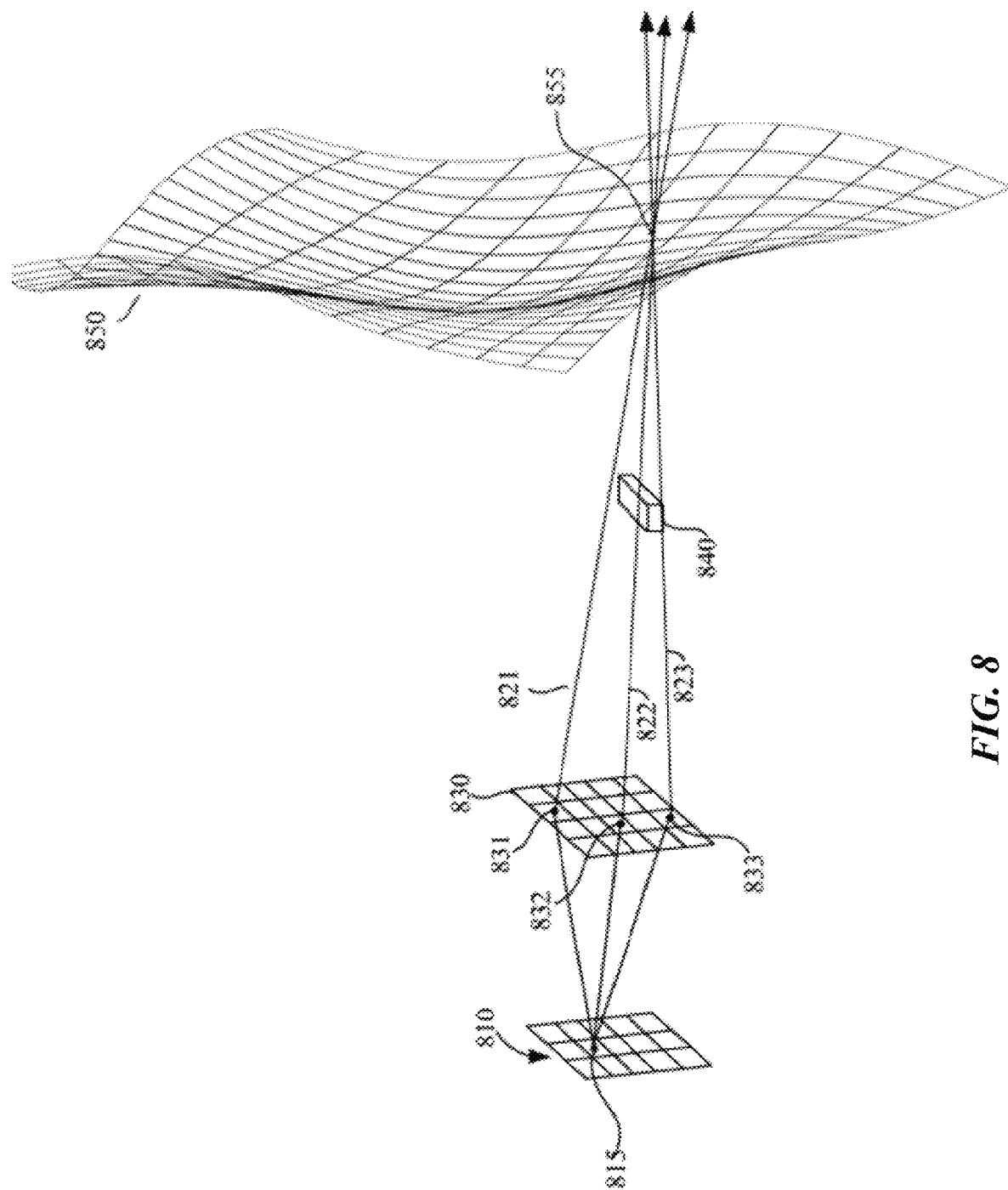
FIG. 8 illustrates an example of a focal surface map and camera parameters.

FIG. 8 illustrates an example of using a focal surface map 850 and camera parameters (e.g., aperture, lens size, etc.) to natively (rather than via post-processing) generate an image with defocus or depth-of-field blur. The focal surface map 850, in particular embodiments, may be mathematically or algorithmically defined. In other embodiments, the focal surface map may be defined as a lookup-table. In either case, given a coordinate in screen space, the focal surface map 850 may be used to determine a corresponding coordinate in the 3D space. For example, FIG. 8 includes a conceptual representation of a virtual image sensor array 810 (which could also represent a screen of pixels). Each illustrated grid in the sensor 810 may represent a sensor for a pixel. The focal surface map 850 may define particular points in 3D space that correspond to particular points on the screen/sensor 810. For example, according to the focal surface map 850, the point 855 in 3D space may map to a representative point 815 for a sensor or pixel (or subpixel) in the sensor array or screen. As previously described, point 855 conceptually may represent the point in space that would be in focus as seen at the corresponding point 815. As previously described, subsample locations for each grid of the sensor may similarly map to particular points on the focal surface map 850.

In addition to the focal surface map 850, particular embodiments may also enable an application to define parameters of a virtual camera. Rather than using a pinhole camera that is represented by a point in space, particular embodiments may enable applications to define a more realistic virtual camera. For example, FIG. 8 represents parameters of a virtual camera with grid 830. Since a camera has physical dimensions (rather than a point in space), the grid 830 is used to represent the various sample points (e.g., points 831, 832, 833) through which rays may travel. The grid 830, for example, may represent uniform sample points on the aperture or lens of a virtual camera. In particular embodiments, an application may specify the size of the aperture/lens (e.g., by specifying the radius of a circular area of the aperture/lens, the differential of a square area of the aperture/lens, or the length and width of a rectangular area of the aperture/lens). The size may, in turn, be used to determine the size/dimensions of the grid 830. In particular embodiments, the granularity of the grids 830 may also be controlled by the application. While in this example a grid 830 is used as the data structure for representing the lens or the aperture of the lens, the present embodiments are not limited to using grids. For example, the points in space through which rays may be cast may be represented by a vector or list of coordinates or it may be procedurally defined (e.g., via a mathematical formula).

During raycasting/tracing, particular embodiments may iteratively determine object visibility for each pixel. In the example shown in FIG. 8, the system may be determining object visibility for the point 815. Since the color of the pixel associated with point 815 may depend on light entering from different points of the lens, particular embodiments may conceptually project rays that originate from the point 815 through various points, such as points 831-833, defined by the grid 830. In other words, these points 831-833 may be considered as a sample of points on the lens through which light may hit the virtual camera sensor represented by point 815. In particular embodiments, the system may project rays 821, 822, and 823 from points 831, 832, and 833, respectively, through the point 855, as defined by the focal surface map 850.

In the example shown, ray 821 misses the object 840, ray 822 nearly misses it, and 823 intersects it. Since the point of intersection (or lack thereof) for the rays are sufficiently different, the resulting color computation for the pixel represented by point 815 would not be purely that of the object 840, and as such, the object 840 would appear blurry in the final scene. If instead the object 840 is posited at or near point 855, the object would be within the depth of field and appear much sharper. Similarly, visibility tests may be performed at the subsample level. In this case, each subsample location (e.g., one that is associated with the pixel represented by the point 810) may similarly map to a point on the focal surface map 850 (e.g., a point in the grid represented by point 855). Visibility tests may be performed by casting subsample rays from the subsample location, through the various points defined by grid 830 (e.g., through the aperture), and through the corresponding point on the focal surface map 850.

Figure 9:
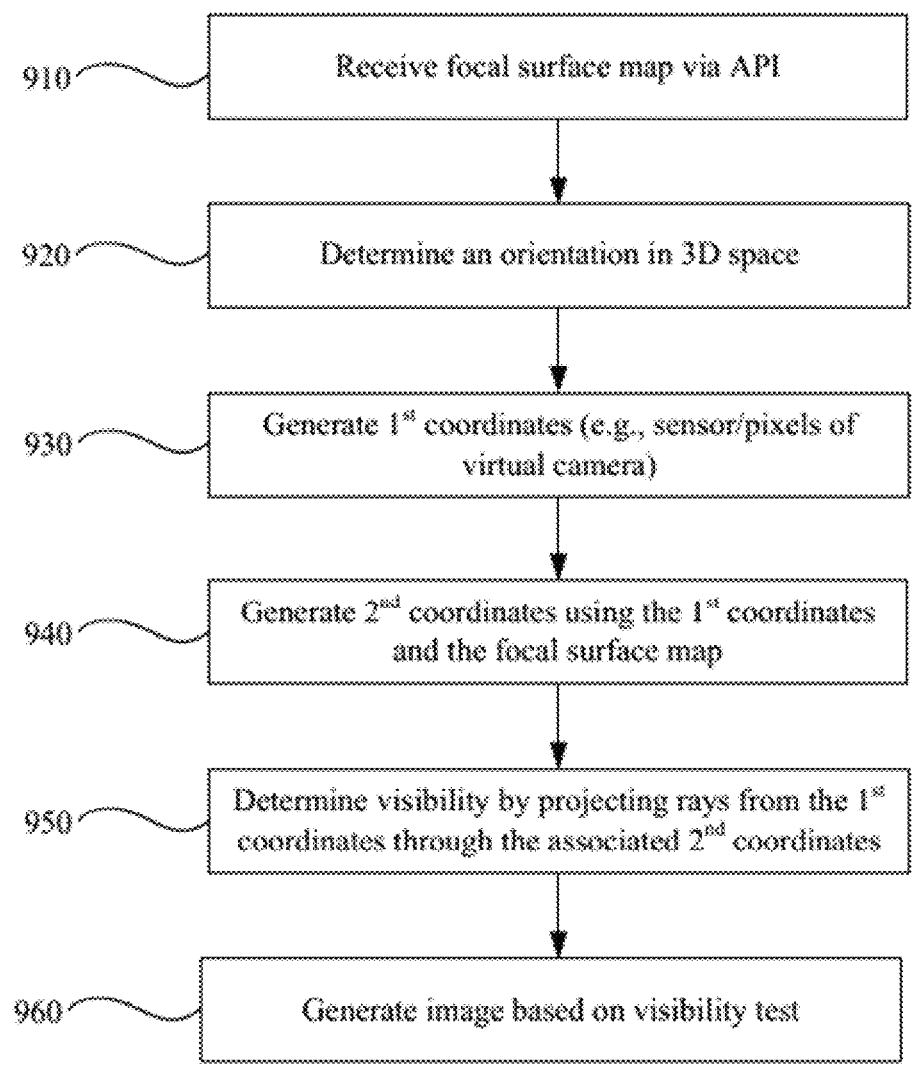
FIG. 9 illustrates a method for natively generating an image with optical distortion for a VR device.

FIG. 9 illustrates a method for natively generating an image with optical distortion for a VR device, in accordance with particular embodiments. At step 910, a computing system may receive a focal surface map specified by an application through an application programming interface (API). For example, a VR/AR application (e.g., a game) may send instructions to the graphics API, including definitions of a focal surface map. In particular embodiments, the focal surface map may be defined as a grid of coordinates relative to a plane that represents an image sensor array. For example, each grid in the focal surface map may map to or be associated with a grid that represents an array sensor or the corresponding pixels on a screen. For instance, the top-left grid in the focal surface map may be associated with the top-left sensor/pixel, the top-right grid in the focal surface map may be associated with the top-right sensor/pixel, and so forth. Each grid in the surface map may store a coordinate in a 3D space where the relative positions of the surface and the sensor array or pixels may be defined (this 3D space may be different from the 3D world space for which a scene is to be generated). In particular embodiments, the focal surface map may instead be specified by an algorithm. For example, a mathematical function or rule-based algorithm may take as input a coordinate (e.g., a 2D coordinate that represents a point in a sensor array or pixel screen) and outputs a 3D coordinate.

At step 920, the system may determine an orientation in a three-dimensional (3D) space, which may represent the orientation of a virtual camera or viewer in the 3D space. In particular embodiments, the orientation may be specified by the VR application, which in turn may be based on sensor data generated by a virtual reality device. For example, a head-mounted device may include a gyroscope or inertial measurement unit that tracks the user's real-time movements and output sensor data to represent or describe the movement. The sensor data provided by such motion-tracking sensors may be used by the VR application to determine the user's current orientation and provide that orientation to the rendering engine to orient/reorient the virtual camera in the 3D space.

At step 930, the system may generate a plurality of first coordinates in the 3D space based on the determined orientation. For example, the plurality of first coordinates may represent the image sensors of the virtual camera or pixels on a corresponding virtual screen. In particular embodiments, one or more transformation matrices or other transformation algorithms may be used to position and orient the virtual image sensors/screen in the 3D space. Each point on the virtual image sensor/screen for which the rendering system will sample may be represented by a coordinate in the 3D space.

At step 940, the system may generate a plurality of second coordinates in the 3D space using the plurality of first coordinates and the focal surface map. The second coordinates, for example, may be the points in 3D space that represent positions where objects would appear in focus (e.g., the points defined by the focal surface map 750 in FIG. 7, such as point 751). Each of the plurality of first coordinates may be associated with one of the plurality of second coordinates. For example, as shown in FIG. 7, point 711 (which is defined by a coordinate) maps to or is associated with point 751 according to the focal surface map 750.

In particular embodiments, the system may generate the second coordinates by performing a look-up operation using the focal surface map. For example, for each of the first coordinates (e.g., each camera sensor/pixel), the system may look up a corresponding grid in the focal surface map to identify a coordinate in the focal surface map that is mapped to the first coordinate. In particular embodiments, the coordinate from the focal surface map may be defined within a space that is different from the 3D world space for which a scene is being generated. Thus, in particular embodiments, the system may use one or more transformation matrices or algorithms to transform the coordinate from the focal surface map into the 3D world space to generate, e.g., point 751 in the 3D world space.

In particular embodiments, the system may alternatively generate the second coordinates procedurally. For example, in particular embodiments the focal surface map may be specified by an algorithm. As such, the system may generate the plurality of second coordinates by processing the plurality of first coordinates in accordance with the algorithm. For example, the algorithm may be defined mathematically so that, given an input coordinate (e.g., the coordinate of a point on the virtual image sensor, such as point 711 in FIG. 7), the algorithm would output a corresponding coordinate. In particular embodiments, the output coordinate may be in the same space as the space in which the input coordinates are defined. For example, particular embodiments of the algorithm may be configured to receive an input coordinate that is defined in the non-world space. As such, the output of the algorithm may be the relative position of the focal point to the input coordinate in the non-world space. If so, the system may then be transformed (e.g., via a transformation matrix) into the 3D world space based on the current orientation of the virtual camera. In other embodiments, the algorithm may take as input a coordinate that is defined within the 3D world space (e.g., the coordinate of point 711 in FIG. 7) and output a coordinate in the 3D world space (e.g., the coordinate of point 751 in FIG. 7). In this case, no subsequent transformation is needed.

At step 950, for each of the plurality of first coordinates, the system may determine visibility of one or more objects defined within the 3D space by projecting a ray from the first coordinate through the associated second coordinate to test for intersection with the one or more objects. For example, in FIG. 7, ray 721 is projected from point 711 through the associated point 751 as defined by the focal surface map. The ray that is cast may be used to test for intersections (or visibility) with any object that is defined within the 3D world space. For example, FIG. 7 shows that the object 740 is not visible to the sensors/pixels at points 711 and 713, but it is visible to the sensors/pixels at point 712. In particular embodiments, the ray may be subsample rays, rather than the primary ray associated with a pixel, as described elsewhere herein. In particular embodiments, what is projected may also be a beam instead (e.g., a beam projected from a tile or block). In particular embodiments, the coverage of a beam in the 3D world space may be computed using the associated primary rays and the focal surface map. For example, using the focal surface map, the trajectory of each primary ray may be determined. To determine the coverage of a beam, the system may use the aforementioned differentials of the ray to compute its ray footprint, and in turn the ray footprints associated with the beam may be collectively used to define the coverage of the beam as it projects through the 3D world space.

At step 960, the system may generate an image of the one or more objected in the 3D world space based on the determined visibility of the one or more objects. As previously described, the system may use the projected rays to determine object visibility from the standpoint of the virtual camera. Object visibility may be tracked by storing the depth of each intersecting object (e.g., the triangle or other primitives) and its index. Using this visibility information, the system may proceed with shading to determine what color should be assigned to each pixel. The collective pixels would then be used to generate the image, which would be a scene of the 3D world space from the vantage point of the virtual camera. This image may include any object defined within the 3D world space that is visible to the virtual camera.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for natively generating an image with optical distortion for a VR device, including the particular steps of the method of FIG. 9, this disclosure contemplates any suitable method for doing so, including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Another benefit of particular embodiments is the native support for generating foveated images. Conventional graphics drivers lack support for efficient foveated rendering, because they assume that pixels have equal value, weight, and write-to quality. Thus, when conventional systems generate an image, every pixel is treated equally regardless of position, including the computational resources expended. The equal treatment of pixels, however, is not suitable for foveated imaging, which is often desirable in VR. For example, in a VR scene, the peripheral view may be blurry or foveated effects may help direct the attention of the user to particular fixation points. The blurry portions of a foveated image could afford to have less detail, and as such computational resources expended on rendering areas outside of the fixation points would be wasted or undesirable.

Particular embodiments of a rendering system may accept additional information to generate an image with varying quality as a function of screen position. Because the system is not constrained to sampling on a uniform grid, it can closely match the resolution falloff (e.g., higher sample resolution at the fixation points and fewer samples elsewhere), thus resulting in far fewer shaded samples. The results demonstrate a significant reduction in shading cost by rendering a foveated sample distribution.

Particular embodiments support varying multi-sampling and shading, which may be used to generate foveated images naturally, by providing the flexibility for applications to specify a measure of "importance" per pixel/tile/block. In particular embodiments, the system may support an importance map that indicates (e.g., via a float2/half2/unorm8) a measure of "importance," for example, from 0 to 1 for each image units (e.g., pixel, tile, block, etc.). In particular embodiments, the application may also specify the granularity of the importance (e.g., pixel, tile, block, etc.). For example, through the API of a graphics driver, an application may specify an importance map with an associated granularity for each scene that the application wishes to generate. In particular embodiments, the importance map may be implemented using a grid data structure, where each grid maps to a pixel or any other type of image unit.

Figure 10:
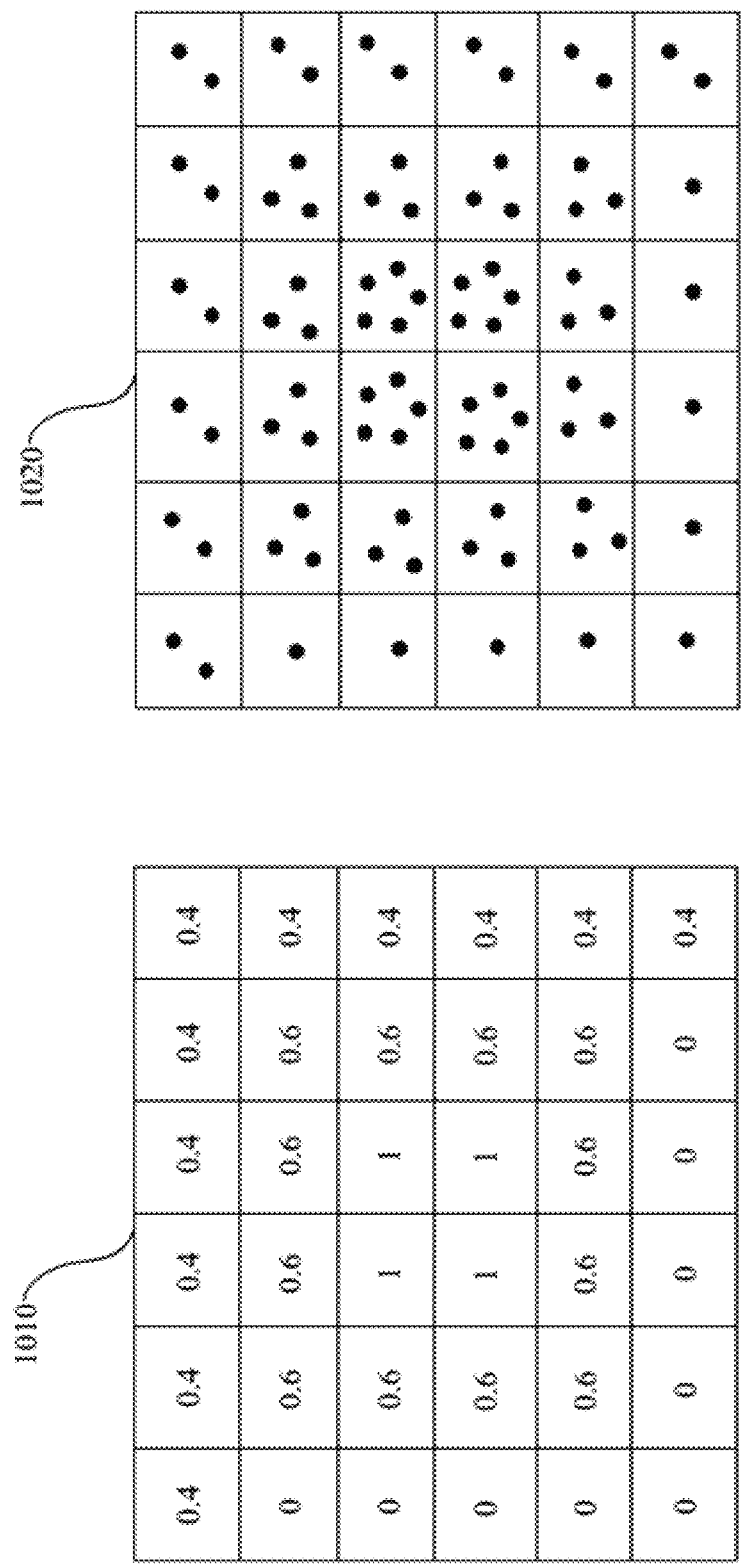
FIG. 10 illustrates an example of an importance map.

FIG. 10 illustrates an example of an importance map 1010. In this example, the importance map 1010 is a 6×6 map, which may be used to specify the relative importance of an image with 6×6 pixels. In particular embodiments, the relative position of each grid in the importance map 1010 corresponds to the pixel at the same relative position in the image. For example, the top-left grid in the importance map 1010 may correspond to the importance of the top-left pixel of the image. Through this importance map 1010, an application may specify the relative importance of each pixel/tile/block individually. In particular embodiments, an importance value closer to 1 may indicate higher importance and an importance value closer to 0 may indicate lower importance. If so, the importance map 1010 in FIG. 10 indicates that the central pixels are important (i.e., the grids marked with 1), the immediate surrounding pixels are of medium importance (i.e., the grids marked with 0.6), the pixels forming the top edge and right edge of the image are of relatively lesser importance (i.e., the grids marked with 0.4), and lastly the remaining pixels on the bottom edge and left edge are of the least importance (i.e., the grids marked with 0).

In particular embodiments, the importance map may be used to adjust multi-sample anti-aliasing (MSAA), shading, and any other graphics tasks. FIG. 10 illustrates an example of the importance map 1010 being used to determine how many rays to use for MSAA per pixel, as illustrated in the MSAA map 1020. When the graphics system is performing MSAA, it may use the importance map 1010 to decide how many subsample rays to use for each pixel. In the example shown, 5 subsample rays are used to sample the pixels in the center because the corresponding grids in the importance map 1010 indicate that those pixels are of high importance. Since the immediate surrounding pixels each has an importance value of 0.6, fewer subsample rays (i.e., 3 in the example shown) are used for sampling. In like manner, 2 subsample rays are used for the pixels on the top edge and right edge because their respective corresponding importance value is 0.4. The remaining pixels on the bottom edge and left edge, which are least important, may only be sampled using 1 ray. Since the importance map indicates that certain regions of the image are less important than others, the system may make an informed decision on where computations may be saved. For example, if every pixel were to be treated equally, a conventional system may use 5 subsample rays for each of the 36 pixels, resulting in the use of 180 subsample rays. In contrast, by indicating the degree of importance for each pixel, the system is able to perform MSAA with only 5×4+3×12+2×11+1×9=87 subsample rays.

In particular embodiments, importance values may alternatively be implicitly defined using a focal surface map. A focal surface map, as described above, may defined points that map to corresponding points on a virtual image sensor or screen. For areas on a screen where higher resolution or more detail is desired (e.g., areas at or near the fixation points), the corresponding definition of points on the focal surface map may be more dense or granular, which in turn may cause more rays/subrays to be generated. Conversely, for areas where less resolution or detail is needed (e.g., areas outside of the fixations points), the corresponding definition of points on the focal surface may be less dense or coarse, which in turn may cause less rays/subrays to be generated.

Figure 11:
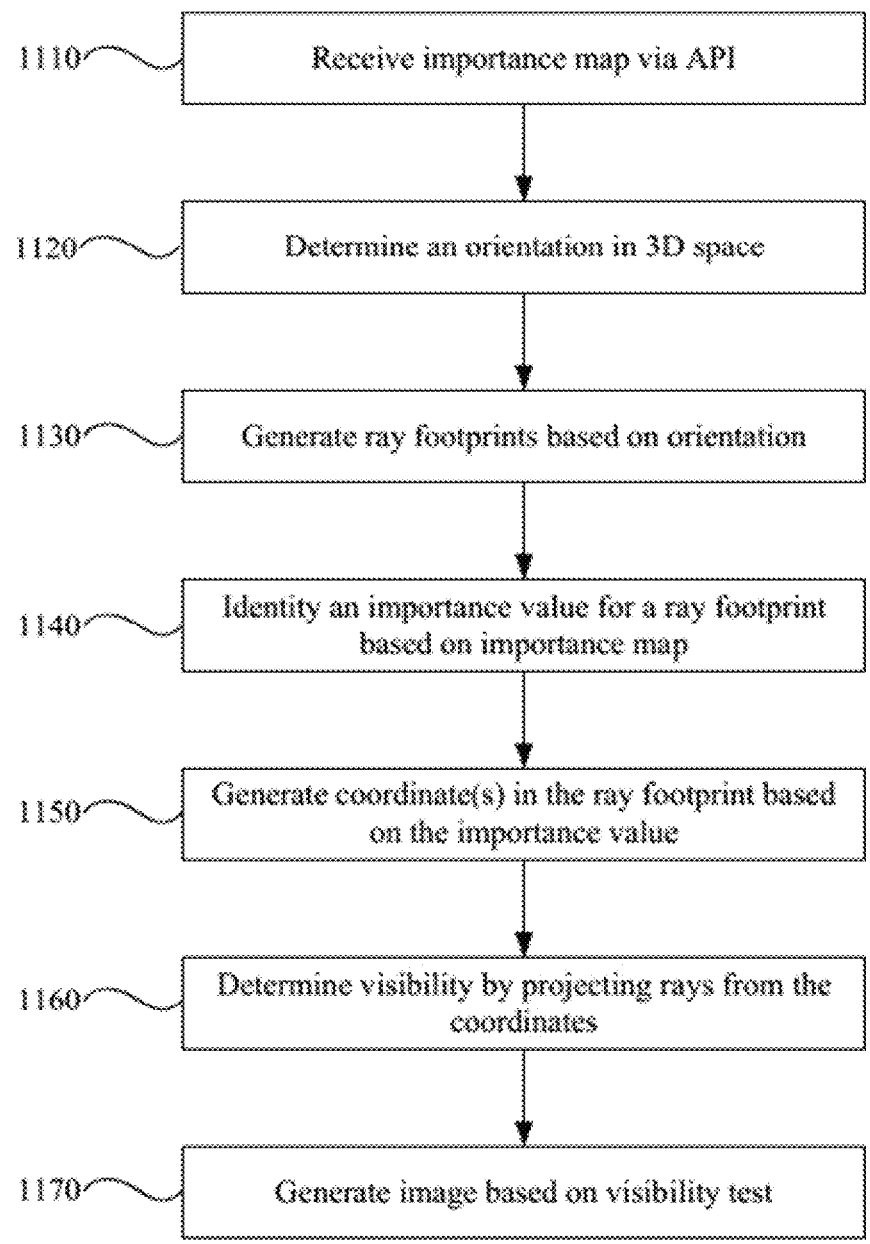
FIG. 11 illustrates an example method for generating an image based on varying multi-sample anti-aliasing.

FIG. 11 illustrates an example method for generating an image based on varying multi-sample anti-aliasing. At step 1110, a computing system may receive an importance map specified by an application through an application programming interface (API). For example, a VR/AR application (e.g., a game) may send instructions to the graphics API, including definitions of an importance map. In particular embodiments, the importance map may include importance values that correspond to pixels (or other image units, such as tiles and blocks) or their respective ray footprints. In particular embodiments, the importance map may be stored in a grid data structure, such as the example shown in FIG. 10. In particular embodiments, the importance map may alternatively be defined procedurally, such as based on an algorithm or mathematical formula that outputs an importance value as a function of pixel/footprint position. For example, the importance map may procedurally define the center to be the most important, and the level of importance may progressively decrease for pixels farther away from the center. In particular embodiments, what is "important" may also be specified based on the density of a focal surface map. For example, areas of the focal surface map having denser grids (which correspond to denser rays that should be cast through such areas) may implicitly indicate that such areas are more important.

At step 1120, the system may determine an orientation in a three-dimensional (3D) space, which may represent the orientation of a virtual camera or viewer in the 3D space. In particular embodiments, the orientation may be specified by the VR application, which in turn may be based on sensor data generated by a virtual reality device. For example, a head-mounted device may include a gyroscope or inertial measurement unit that tracks the user's real-time movements and output sensor data to represent or describe the movement. The sensor data provided by such motion-tracking sensors may be used by the VR application to determine the user's current orientation and provide that orientation to the rendering engine to orient/reorient the virtual camera in the 3D space.

At step 1130, the system may generate a plurality of ray footprints in the 3D space based on the determined orientation. For example, the plurality of ray footprints may respectively represent the pixels on a virtual screen (or the corresponding image sensor array). In particular embodiments, each of the ray footprints may be defined by a center coordinate and at least one differential. For example, a square or rectangle footprint may be defined by perpendicular differentials, represented as vectors, as previously described. In particular embodiments, one or more transformation matrices or other transformation algorithms may be used to position and orient the ray footprints in the 3D space, based on the orientation of the virtual camera.

At step 1140, the system may, for each of the ray footprints, identify a corresponding number of subsamples to generate for that ray foot print. In particular embodiments, the number of subsamples to be generate may be determined based on an importance value defined based on the importance map (e.g., more subsamples for highlight importance values and fewer subsamples for lower importance values). In particular embodiments, the importance value may be identified by looking up the importance map. For example, the corresponding importance value for a ray footprint may be identified based on (1) a relative position of the importance value in the grid data structure and (2) a relative position of the ray footprint's corresponding pixel in the pixel array/grid. For example, referring to FIG. 10, the relative position of the upper-left importance value, 0.4, in the importance map may be identified as (1,1) in the grid. This importance value may correspond to the pixel, or its corresponding ray footprint, at the (1,1) position in the image. Alternatively, as previously described, the importance map may be procedurally defined so that it outputs an importance value given a position. As yet another alternative, the importance value may be implicitly defined by the density of areas within a focal surface map (e.g., more subsamples are generated for denser areas and fewer subsamples are generated for less dense areas). The importance map therefore allows different ray footprints to have different importance values. For example, an application may use an importance map to define that certain pixels (or their corresponding ray footprints), such as the center pixels of an image, are more important than other pixels, such as the pixels on the edge of the image.

At step 1150, the system may generate one or more coordinates in each ray footprint based on the corresponding importance value (whether explicitly defined by an importance map, procedurally defined, or implicitly defined by a focal surface map). The coordinates may be of subsample locations within the ray footprint. In particular embodiments, the number of coordinates that is to be used may be a function of the importance value. For example, if the maximum of subsample rays that can be used per ray footprint is 5 and an importance value can range from 0 to 1, 5 subsample rays may be used for importance values from 0.8 to 1, 4 subsample rays may be used for importance values from 0.6 to 0.8, 3 subsample rays may be used for importance values from 0.4 to 0.6, 2 subsample rays may be used for importance values from 0.2 to 0.4, and 1 subsample ray may be used for importance values lower than 0.2. Thus, if a ray footprint has an importance value of 1, the system may generate 5 subsample coordinates, which would be greater than the number of subsample coordinates generated for another ray footprint that has a lesser importance value, such as 0.4. In an embodiment where the importance map is used to generate a foveated image with a fixation area that should be in focus/sharp, the ray footprint that has an importance value of 1 may be associated with the fixation area and the ray footprint that has a lower importance value (e.g., 0.4) may be associated with an area in the image that is outside of the fixation area.

At step 1160, the system may determine visibility of one or more objects defined within the 3D space by projecting a ray from each of the one or more coordinates to test for intersection with the one or more objects. In particular embodiments, the rays may be considered as subsample rays projected from a pixel's footprint. Any intersections with objections in the 3D scene may cause the depth of the intersection and the index of the triangle hit to be stored.

At step 1170, the system may generate an image of the one or more objected in the 3D world space based on the determined visibility of the one or more objects. As previously described, the system may use the projected rays to determine object visibility from the standpoint of the virtual camera. Object visibility may be tracked by storing the depth of each intersecting object (e.g., the triangle or other primitives) and its index. Using this visibility information, the system may proceed with shading to determine what color should be assigned to each pixel. The collective pixels would then be used to generate the image, which would be a scene of the 3D world space from the vantage point of the virtual camera. This image may include any object defined within the 3D world space that is visible to the virtual camera.

Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for generating an image based on varying multi-sample anti-aliasing, including the particular steps of the method of FIG. 11, this disclosure contemplates any suitable method for doing so, including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Particular embodiments may provide applications with the flexibility to account for differences in subpixel characteristics. While a pixel is often thought of as a single physical display unit capable of displaying any color, it is in fact made up of multiple subpixels, located at different locations, that are capable of displaying individual primary colors (e.g., red, green, and blue). Since different colors have different wavelengths, the colors behave differently through optics.

To generate a more realistic scene, the system in particular embodiments may account for these chromatic differences at the subpixel level. In particular embodiments, the system may support per-channel focal surface maps (e.g., one surface map for red, one for green, and one for blue). For example, the system may allow an application to specify whether there is a single focal surface map or three focal surface maps for three color channels, respectively. If three focal surface maps are used, one may be associated with a first primary color (e.g., red), another may be associated with a second primary color (e.g., green), and the third may be associated with a third primary color (e.g., blue). The color-specific focal surface maps are independent from each other and may be separately defined based on chromatic characteristics (e.g., the three colors may have different focal surfaces to characteristics of different light wavelengths). During visibility tests, the system may cast three sets of rays, with each set utilizing one of the three color-specific focal surface maps. For example, for a particular pixel, one set of rays/subrays may be cast in a direction specified by the red focal surface map, a second set may be cast based on the green focal surface map, and a third set may be cast based on the blue focal surface map. While more rays may need to be cast compared to embodiments that use a single focal surface map, one benefit is that the system may naturally correct for chromatic aberrations.

Similarly, particular embodiments may also support per-channel importance maps (e.g., one for red, one for green, and one for blue). For example, in embodiments where the primary colors are separately simulated using multiple focal surface maps, corresponding importance maps may be used to specify the density of subsample rays that should be used as a function of sensor/screen area.

Particular embodiments described herein supports a technique that is termed "beam racing." In the graphics rendering pipeline, each primitive is rendered in memory before the scene is rasterized. In other words, pixels in the final scene are generate one by one after objects in the scene have been rendered. The pixels are displayed together and assumed to represent the scene at a particular instant in time. However, since it takes time to generate the pixels, there may be significant time lag (e.g., 11 milliseconds) between the time when objects are rendered and the time when the pixels are displayed. In conventional display contexts (e.g., movies, animation, etc.), the lag may not be noticeable. This is not the case in the VR/AR context, however. In VR/AR, a user expects immediate feedback between movement and visual perception. For example, as the user turns his head, he expects the scene to change at that instant and the current display to reflect his current point of view. Any delays, such the time tag for generating and outputting pixels after rendering, may negatively affect the user experience. For example, if at time $t_0$ the user is standing up, the system may begin to render a scene based on the elevated perspective of the user. However, by the time the pixels of the scene are output at time to +11 ms, the user may be sitting down. Since the user is now expecting to see a scene from a lower vantage point, seeing a scene that does not reflect such expectation would negatively affect the VR experience and may even cause dizziness or nausea.

Figure 12:
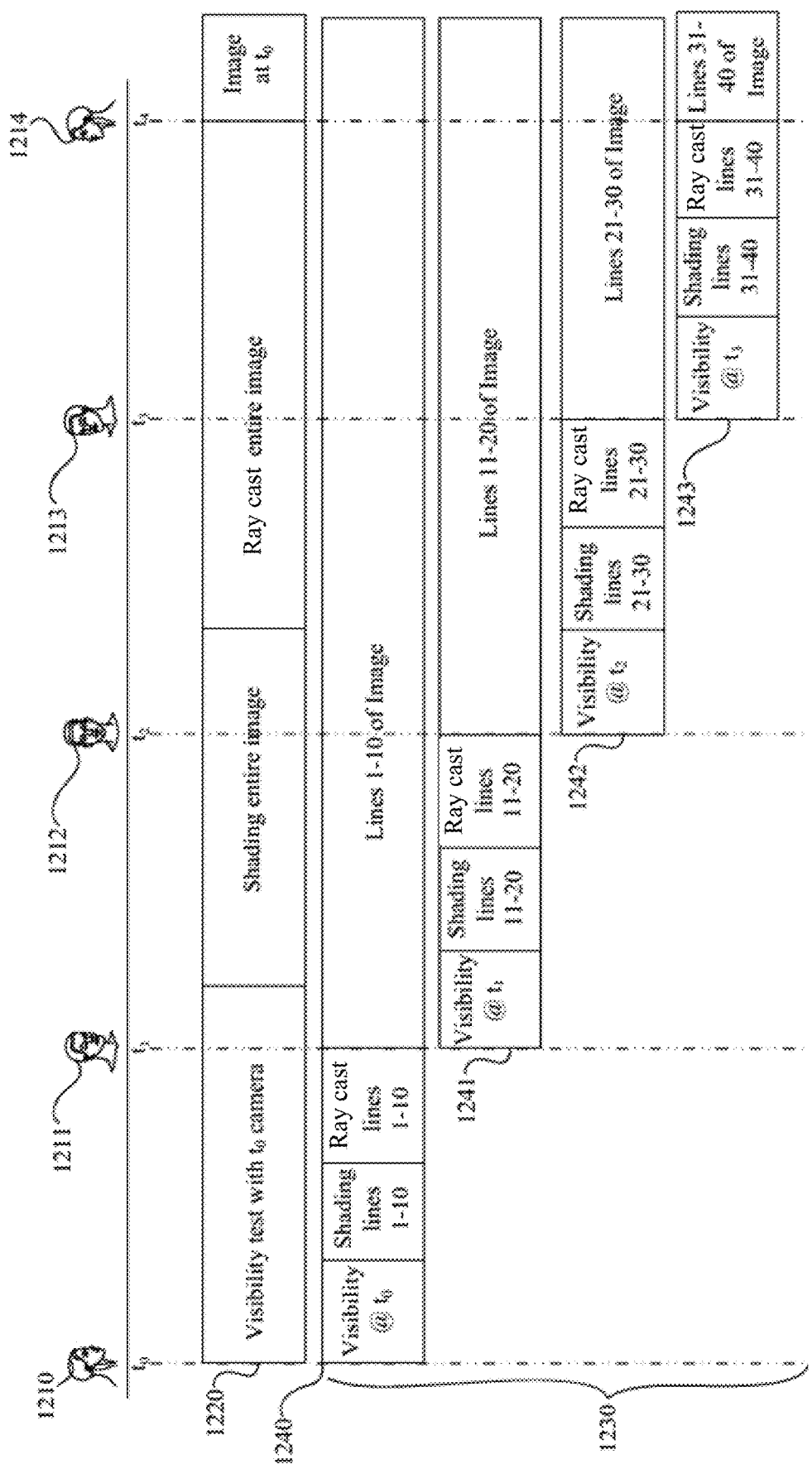
FIG. 12 illustrates examples comparing a graphics-generation timeline without using beam racing to timelines using beach racing.

FIG. 12 illustrates examples comparing a graphics-generation timeline without using beam racing to timelines using beach racing. In particular, FIG. 12 illustrates a graphics generation timeline 1220 that generates and outputs an entire image at the same time. In the illustrated example, a user wearing a VR device may be rotating his head quickly from position 1210 at time $t_0$ to position 1214 at time $t_4$. If the pipeline 1220 is configured to generate an entire image, it may begin by configuring the orientation of the virtual camera based on the head orientation 1210 of the user at time $t_0$ and proceed with shading and ray casting the entire image. By the time the image is ready to be output, the time may be $t_4$. However, at time $t_4$, the user's head orientation 1214 may have changed significantly from the time $t_0$ orientation 1210, yet the image that is presented to the user may have been based on the user's head orientation 1210 at $t_0$. This lag may cause a sense of disorientation for the user.

Particular embodiments reduce the latency between rendering and image display by outputting pixels scan line by scan line, where each line is generated based on renderings made when it is that line's turn to be output. For example, the system may render at time $t_0$ and ray cast line 0 (rather than the whole scene) based on the to rendering; render at time $t_1$ and ray cast line 1 based on the $t_1$ rendering; and so on. Since the system is only processing one line at a time (or multiple predetermined lines at a time but not the all the lines together), the delay between render time and pixel-output time becomes much shorter, and the renderings would be based on the latest movement/perspective of the user. As a result, real-time scene changes would be much more reactive. This "beam racing" technique has the potential to significantly reduce the head-movement to photon latency. Even significant batching, such as hundreds of lines (hundreds of thousands of pixels) could provide large multiplicative reductions in latency over waiting for the full frame before scan-out. In particular embodiments, the system may schedule rendering and ray casting tasks with respect to the scan-out clock.

Referring again to FIG. 12, the beam racing graphics pipeline 1230 shows an example of the beam racing technique. In this example, each video frame displayed has 40 horizontal lines. The first timeline 1240 represents the timing of generating the first 10 lines (lines 1 to 10) of the video frame. At time $t_0$, the system may use latest motion sensory data available at that time (e.g., from a VR device's inertial measurement unit, gyroscope, etc.) to orient the virtual camera and perform visibility tests. The system may then perform shading and ray casting lines 1-10 of the video frame. In the example shown, lines 1-10 are ready by time $t_1$ and displayed to the user. Since the system is only tasked with generating 10 lines rather than all 40 lines, the duration needed for generating lines 1-10 (e.g., $t_1-t_0$) is significantly shorter than the duration needed for generating the whole image (e.g., $t_4-t_0$), as shown by timeline 1220. Thus, at time $t_1$, the user would be presented with lines 1-10 that were generated using the latest sensor information from to, which is much more current than the scenario shown by timeline 1220. In particular embodiments, lines 1-10 may be on continuous display until the rest of the lines in the video frame have been generated, and the process would repeat to generate updated lines 1-10 based on the virtual camera's updated orientation/position.

In particular embodiments, after the system generates lines 1-10, it may proceed to generate lines 11-20, as represented by timeline 1241. The process may begin at time $t_1$, at which time the system may perform visibility tests based on the latest sensor data available at that time. The system may again go through the process of shading and ray casting, and then output lines 11-20 at time $t_2$. Thus, at time $t_2$, the user is presented with lines 11-20 that are generated based on sensory data from time $t_1$. The system may then repeat the process to generate lines 21-30, starting from time $t_2$ and ending at time $t_3$, and then generate liens 31-40, starting from time $t_3$ and ending at time $t_4$. Thus, at time $t_4$, the user is presented with a video frame that includes much more current information (e.g., as early as time $t_3$), compared to the scenario presented by the timeline 1220, where the user at time $t_4$ is presented with a frame generated based on to data.

In particular embodiments, the rendering system may further predict a user's head position/orientation to output scenes that match a user's expectations. For example, if the user is in the process of turning, the system may predict that the user would continue to turn in the next frame and begin rendering a scene based on the predicted camera position/orientation. If the latency is 11 ms, the system would have to predict farther ahead, which his more difficult and likely more erroneous. If the latency is significantly reduced (e.g., to 1 ms), the system would only need to predict 1 ms ahead. This makes the prediction task much easier and less error-prone.

Figure 13:
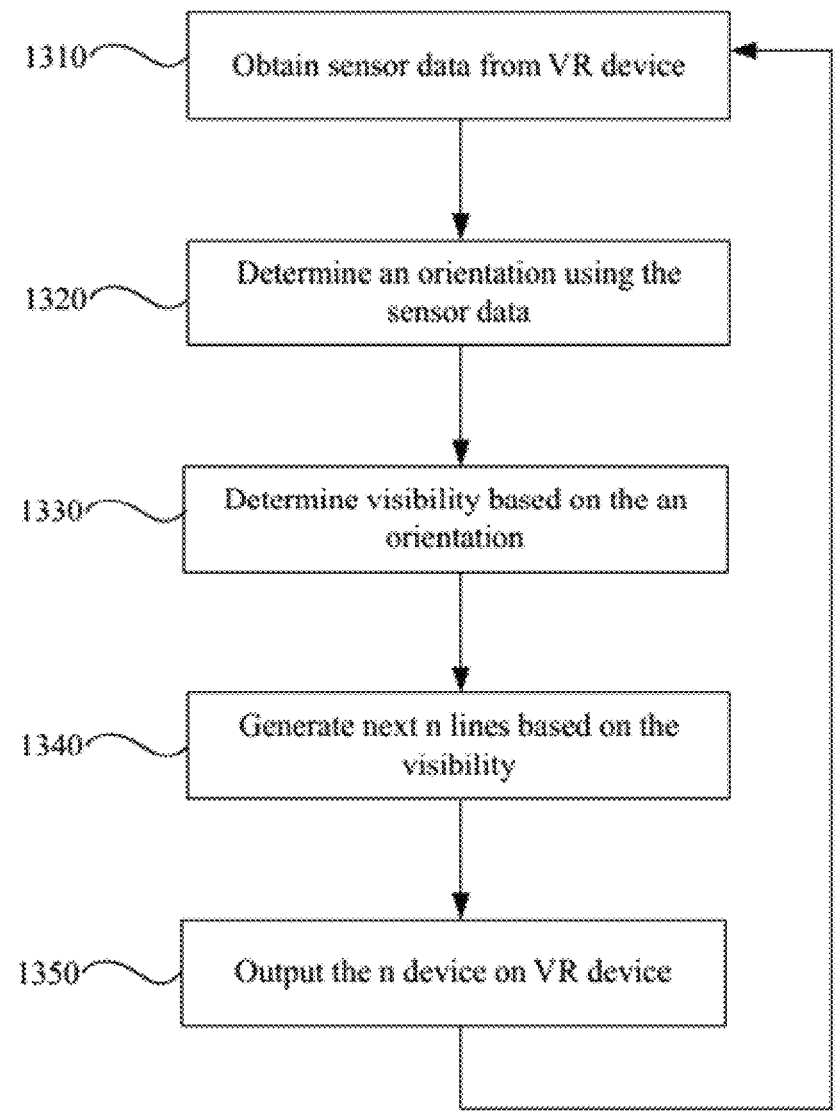
FIG. 13 illustrates an example method for generating video frames for a VR display using beam racing.

FIG. 13 illustrates an example method 1300 for generating video frames for a VR display using beam racing. The method may begin at step 1310, where a computing system may obtain sensor data generated by a virtual reality (VR) device at, for example, time $t_0$. The VR device, for example, may include a head mounted display and one or more motion sensors, such as an inertial measurement unit, gyroscope, accelerometer, etc. At step 1320, the system may use the sensor data from $t_0$ to determine a first orientation in a three-dimensional (3D) space. For example, based on the rotational data from a gyroscope and the last known orientation of the user in the 3D space, the system may compute a current orientation of the user. In particular embodiments, the user's orientation may be represented in the 3D space by orienting/positioning a virtual camera in the 3D space.

At step 1330, the system may determine a visibility of one or more objects defined within the 3D space by projecting rays based on the determined orientation to test for intersection with the one or more objects. For example, based on the orientation of the virtual camera in 3D space, the system may project rays into the 3D space to test for intersections with any object that is defined therein. In particular embodiments, the direction of the rays may be based on a focal surface map (or multiple focal surface maps, one per primary color), as described herein. The density of the rays may also be defined by the focal surface map or a separate importance map, as described herein.

At step 1340, the system may generate n lines (e.g., 1, 3, 5, 10, 100 lines, etc.) of pixels based on the determined visibility of the one or more objects. In particular embodiments, the generation of the pixels may be the result of shading and rasterization processes. The n number of lines that is generated may be a subset of the total lines of pixels in the VR display. Continuing the example from above, if the VR display has a total of 40 lines, at this stage the system may generate line 1-10 of the display. In other words, the number of lines generated may be a subset of the total number of lines.

At step 1350, the system may output the n generated lines of pixels for display by the virtual reality device. As previously described, rather than updating all the lines of the display based on the same virtual camera orientation, the system in particular embodiments may only update a subset, such as lines 1-10.

In particular embodiments, the process of generating and outputting a subset of lines may then be repeated for the next subset of lines. For example, at step 1310, the system may obtain the latest sensor data from the VR device (e.g., the sensor data associated with time $t_1$). At step 1320, the system may again determine a second orientation in the 3D space based on the latest sensor data from the VR device. At step 1330, the system may then proceed to determine a visibility of any objects defined within the 3D space by projected rays based on the second orientation to test for intersection with the objects. At step 1340, the system may generate another n lines of pixels (e.g., lines 11-20) based on the determined second visibility of the one or more objects. At step 1350, the system may output the n lines of pixels for display by the virtual reality device. As shown in FIG. 12, by the end of the timelines 1240 and 1241, the lines 11-20 is displayed concurrently with the lines 1-10.

The steps illustrated in FIG. 13 may repeat until all the lines of the display are generated and outputted. Each n lines of pixels may be considered as a subset of the total lines of pixels of the display, and each set of n lines may be sequentially and iteratively generated. For example, if the total number of lines is 40, the system may generate, in order, lines 1-10, 11-20, 21-30, and 31-40, and the process may thereafter repeat, starting against from the first set of lines (e.g., lines 1-10). So once a first set of n lines associated with time $t_0$ is output, the set of lines may remain unchanged until after each of the other lines of the display is generated (using sensor data generated by the VR device after $t_0$). Once it is again the first set of lines' turn to be generated, the first set of lines may be replaced by lines of pixels generated based on the latest sensor data.

In FIG. 13, the process shows that the step of determining the second orientation is performed after the outputting of the one or more first lines of pixels (e.g., the lines of pixels generated based on the orientation associated with time $t_0$). In particular embodiments, a multi-threaded or multi-processor computing system may begin the process of generating the next set of n lines of pixels before the previous set of n lines of pixels is output. For example, if lines 11-20 are generated based on sensor data from time $t_1$, time $t_1$ may be any time while the system is processing steps 1320-1350 for the previous set of lines 1-10.

In particular embodiments, the number of lines generated per iteration may be equal to a predetermined number. For example, n may be preset to be 1, 5, 10, 20, etc. In particular embodiments, the graphics system may predefine this number. Alternatively or additionally, the graphics system may allow an application to specify the number of lines that should be generated per iteration. For example, an application requesting the graphics system to generate a scene may specify the number of lines that it wishes to generate per iteration. The application may communicate this information to the graphics system through an API, for example.

Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for generating video frames for a VR display using beam racing, including the particular steps of the method of FIG. 13, this disclosure contemplates any suitable method for doing so, including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Figure 14:
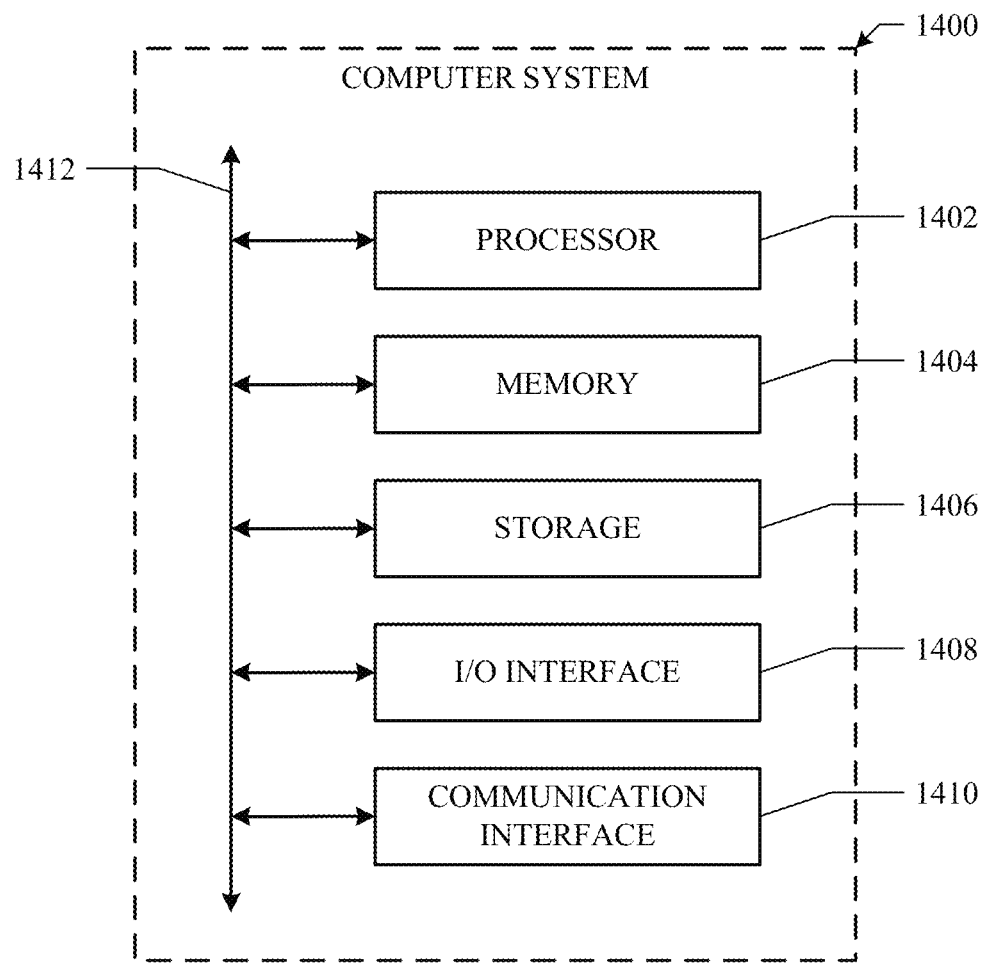
FIG. 14 illustrates an example computer system.

FIG. 14 illustrates an example computer system 1400. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real-time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it. As an example and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
receiving a focal surface map specified by an application through an application programming interface (API);
determining an orientation in a three-dimensional (3D) space, wherein the orientation is based on sensor data generated by a virtual reality device;
generating a plurality of first coordinates in the 3D space based on the determined orientation;
generating a plurality of second coordinates in the 3D space using the plurality of first coordinates and the focal surface map, wherein each of the plurality of first coordinates is associated with one of the plurality of second coordinates;
for each of the plurality of first coordinates, determining visibility of one or more objects defined within the 3D space by projecting a ray from the first coordinate through the associated second coordinate to test for intersection with the one or more objects; and
generating an image of the one or more objected based on the determined visibility of the one or more objects.

2. The method of claim 1, wherein the focal surface map is a grid of coordinates, wherein the generating of the plurality of second coordinates comprises:
for each of the plurality of first coordinates, identifying a coordinate in the focal surface map that is mapped to the first coordinate and generating the associated second coordinate based on the identified coordinate in the focal surface map.

3. The method of claim 1, wherein the focal surface map is specified by an algorithm, wherein the generating of the plurality of second coordinates comprises:
for each of the plurality of first coordinates, generating the associated second coordinate by processing the first coordinate in accordance with the algorithm.

4. The method of claim 1, wherein the focal surface map is associated with a first primary color, wherein the generating of the image is further based on a second focal surface map associated with a second primary color and a third focal surface map associated with a third primary color.

5. The method of claim 1, wherein a smallest angle between the ray projected from one of the plurality of first coordinates and the ray projected from another one of the plurality of first coordinates is more than 90 degrees.

6. The method of claim 1, wherein the plurality of second coordinates fit on a curved surface defined by the focal surface map.

7. The method of claim 1, wherein the focal surface map is defined by a Catmull-Rom surface.

8. One or more computer-readable non-transitory storage media embodying software that is operable when executed to cause one or more processors to perform operations comprising:
receiving a focal surface map specified by an application through an application programming interface (API);
determining an orientation in a three-dimensional (3D) space, wherein the orientation is based on sensor data generated by a virtual reality device;
generating a plurality of first coordinates in the 3D space based on the determined orientation;
generating a plurality of second coordinates in the 3D space using the plurality of first coordinates and the focal surface map, wherein each of the plurality of first coordinates is associated with one of the plurality of second coordinates;
for each of the plurality of first coordinates, determining visibility of one or more objects defined within the 3D space by projecting a ray from the first coordinate through the associated second coordinate to test for intersection with the one or more objects; and
generating an image of the one or more objected based on the determined visibility of the one or more objects.

9. The media of claim 8, wherein the focal surface map is a grid of coordinates, wherein the generating of the plurality of second coordinates comprises:
for each of the plurality of first coordinates, identifying a coordinate in the focal surface map that is mapped to the first coordinate and generating the associated second coordinate based on the identified coordinate in the focal surface map.

10. The media of claim 8, wherein the focal surface map is specified by an algorithm, wherein the generating of the plurality of second coordinates comprises:
for each of the plurality of first coordinates, generating the associated second coordinate by processing the first coordinate in accordance with the algorithm.

11. The media of claim 8, wherein the focal surface map is associated with a first primary color, wherein the generating of the image is further based on a second focal surface map associated with a second primary color and a third focal surface map associated with a third primary color.

12. The media of claim 8, wherein a smallest angle between the ray projected from one of the plurality of first coordinates and the ray projected from another one of the plurality of first coordinates is more than 90 degrees.

13. The media of claim 8, wherein the plurality of second coordinates fit on a curved surface defined by the focal surface map.

14. The media of claim 8, wherein the focal surface map is defined by a Catmull-Rom surface.

15. A system comprising: one or more processors and one or more computer-readable non-transitory storage media coupled to one or more of the processors, the one or more computer-readable non-transitory storage media comprising instructions operable when executed by one or more of the processors to cause the system to perform operations comprising:
receiving a focal surface map specified by an application through an application programming interface (API);
determining an orientation in a three-dimensional (3D) space, wherein the orientation is based on sensor data generated by a virtual reality device;
generating a plurality of first coordinates in the 3D space based on the determined orientation;
generating a plurality of second coordinates in the 3D space using the plurality of first coordinates and the focal surface map, wherein each of the plurality of first coordinates is associated with one of the plurality of second coordinates;

for each of the plurality of first coordinates, determining visibility of one or more objects defined within the 3D space by projecting a ray from the first coordinate through the associated second coordinate to test for intersection with the one or more objects; and generating an image of the one or more objected based on the determined visibility of the one or more objects.

16. The system of claim 15, wherein the focal surface map is a grid of coordinates, wherein the generating of the plurality of second coordinates comprises:

for each of the plurality of first coordinates, identifying a coordinate in the focal surface map that is mapped to the first coordinate and generating the associated second coordinate based on the identified coordinate in the focal surface map.

17. The system of claim 15, wherein the focal surface map is specified by an algorithm, wherein the generating of the plurality of second coordinates comprises:

for each of the plurality of first coordinates, generating the associated second coordinate by processing the first coordinate in accordance with the algorithm.

18. The system of claim 15, wherein the focal surface map is associated with a first primary color, wherein the generating of the image is further based on a second focal surface map associated with a second primary color and a third focal surface map associated with a third primary color.

19. The system of claim 15, wherein a smallest angle between the ray projected from one of the plurality of first coordinates and the ray projected from another one of the plurality of first coordinates is more than 90 degrees.

20. The system of claim 15, wherein the plurality of second coordinates fit on a curved surface defined by the focal surface map.

* * * * *